US 6,686,249 B1

(12) United States Patent
Yukinobu et al.

(10) Patent No.: US 6,686,249 B1
(45) Date of Patent: Feb. 3, 2004

(54) TRANSPARENT CONDUCTIVE LAYERED STRUCTURE, DISPLAY IN WHICH THIS TRANSPARENT CONDUCTIVE LAYERED STRUCTURE IS APPLIED, AND COATING LIQUID FOR FORMING TRANSPARENT CONDUCTIVE LAYER

(75) Inventors: Masaya Yukinobu, Chiba (JP); Yoshihiro Ohtsuka, Chiba (JP); Kenji Kato, Chiba (JP); Yukiko Suekane, Chiba (JP); Midori Fujisaki, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 81 days.

(21) Appl. No.: 09/711,513

(22) Filed: Nov. 14, 2000

(30) Foreign Application Priority Data

| Nov. 25, 1999 | (JP) | .......... 11/334268 |
| Nov. 25, 1999 | (JP) | .......... 11/334269 |
| Jan. 21, 2000 | (JP) | .......... 2000/013547 |
| Jun. 22, 2000 | (JP) | .......... 2000/187577 |
| Jun. 22, 2000 | (JP) | .......... 2000/187578 |
| Sep. 25, 2000 | (JP) | .......... 2000/290739 |

(51) Int. Cl.$^7$ .............................. B32B 15/00
(52) U.S. Cl. .................... 438/328; 428/469; 428/472; 428/497; 428/403; 428/546; 252/514; 72/55
(58) Field of Search ............... 252/514; 72/255; 428/328, 457, 469, 472, 403, 546

(56) References Cited

U.S. PATENT DOCUMENTS 5,744,233 A * 4/1998 Opitz et al. ............... 428/328

(List continued on next page.)

FOREIGN PATENT DOCUMENTS

| EP | 0 649 160 A1 | 4/1995 |
| EP | 0 803 551 A2 | 10/1997 |
| EP | 0 911 859 A1 | 4/1999 |
| JP | 8-77832 | 3/1996 |
| JP | 9-55175 | 2/1997 |
| JP | 9-286936 | 11/1997 |
| JP | WO97/48107 | * 12/1997 |
| JP | 10-188681 | 7/1998 |
| JP | 10-204336 | 8/1998 |

OTHER PUBLICATIONS

Patent Abstract of Japan, Publication No. 09115438, dated May 2, 1997.
Patent Abstract of Japan, Publication No. 07282745, dated Oct. 27, 1995.

*Primary Examiner*—Steven A. Resan
(74) *Attorney, Agent, or Firm*—Westerman, Hattori, Daniels & Adrain, LLP

(57) ABSTRACT

The present invention pertains to a transparent conductive layered structure having a transparent substrate and a transparent 2-layer film consisting of a transparent conductive layer and a transparent coating layer formed in succession on this substrate, that is used for instance, in the front panel of displays, such as CRTs, etc. The above-mentioned transparent conductive layer has as its main components noble metal microparticles with a mean particle diameter of 1 to 100 nm composed of gold and/or platinum and silver and containing 5 to 95 wt % gold and/or platinum, colored pigment microparticles with a mean particle diameter of 5 to 200 nm, and binder matrix. The noble metal microparticles are mixed at a ratio of 1 to 40 parts by weight per 1 part by weight colored pigment microparticles. Moreover, it is characterized in that the transparent 2-layer film has a surface resistance of 10 to 5000 Ω/□, reflectance of 0 to 2.5%, visible light transmittance of 40 to 75%, and standard deviation of transmittance at each wavelength in 5 nm intervals of the visible light wavelength region being 0 to 5%.

12 Claims, 12 Drawing Sheets

U.S. PATENT DOCUMENTS

| | | | |
|---|---|---|---|
| 5,785,897 A | | 7/1998 | Toufuku et al. ............. 252/514 |
| 6,086,790 A | * | 7/2000 | Hayashi et al. ............. 252/500 |
| 6,143,418 A | * | 11/2000 | Takiyama et al. ............ 428/434 |
| 6,261,479 B1 | | 7/2001 | Yukinobu et al. ............ 252/514 |
| 6,268,704 B1 | | 7/2001 | Nishizawa et al. ......... 315/366 |
| 6,348,770 B1 | | 2/2002 | Nishizawa et al. ......... 315/366 |
| 6,447,909 B1 | | 9/2002 | Kato et al. ................... 428/403 |

* cited by examiner

TRANSPARENT CONDUCTIVE LAYERED STRUCTURE, DISPLAY IN WHICH THIS TRANSPARENT CONDUCTIVE LAYERED STRUCTURE IS APPLIED, AND COATING LIQUID FOR FORMING TRANSPARENT CONDUCTIVE LAYER

BACKGROUND OF THE INVENTION

1. Field of the Invention

The present invention relates to a transparent conductive layered structure having a transparent substrate and a transparent 2-layer film consisting of a transparent conductive layer and a transparent coating layer formed in succession on this substrate, which is used, for instance, as the front panel for displays, such as Braun tubes (CRTs), etc., and in particular, relates to a transparent conductive layered structure wherein the visible light transmittance of the transparent 2-layer film has been adjusted to a prescribed range less than 100%, a display in which this transparent conductive layered structure is used, and a coating liquid for forming a transparent conductive layer that is used in the production of transparent conductive layered structures.

2. Description of the Related Art

As a result of office automation in recent years, many OA machines have been introduced to offices and an environment where work must be done all day long facing a display of an OA machine is not uncommon today.

Taking a cathode ray tube (also referred to as the above-mentioned Braun tube; CRT) of a computer as an example of an OA machine, it has been required for the use of such CRTs that, in addition to being able to easily see the display screen in order to prevent a feeling of visual fatigue, adhesion of dust and electric shock attributed to electrification of the CRT screen, etc can be avoided. Furthermore, there recently has been concerned of the detrimental effects on the human body from the low-frequency magnetic waves generated from CRTs and it is desirable that the CRT not leak such electromagnetic waves to the outside.

In addition, the above-mentioned electromagnetic waves are generated from a deflecting coil or a flyback transformer and there is a tendency toward leakage of increasingly large amounts of electromagnetic waves to the surroundings with the development of larger televisions.

Leakage of a magnetic field can be prevented for the most part by precautions such as changing the shape of the deflection coil, etc. On the other hand, it is also possible to prevent leakage of an electric field by forming a transparent conductive layer on the front glass surface of the CRT.

Such methods of preventing leakage of electric field are theoretically the same as measures recently taken to prevent electrification. However, the above-mentioned transparent conductive layer must have a much higher conductivity than conductive layers that have been formed for preventing electrification. That is, although surface resistance of $10^8$ $\Omega/\square$ (ohm per square) is sufficient for preventing electrification, it is necessary to form a transparent conductive layer with a low resistance of at least $10^6$ $\Omega/\square$ or below, preferably $5\times10^3$ $\Omega/\square$ or below, further preferably $10^3$ $\Omega/\square$ or below, to prevent leakage of an electric field (electric field shielding).

Thereupon, several proposals have been made in the past in response to the above-mentioned demands, and of these, the method whereby a coating liquid for forming a transparent conductive layer of conductive microparticles and inorganic binder, such as alkyl silicate, etc., dispersed in a solvent is applied and dried on the front glass of a CRT and then baked at a temperature of about 200° C. is known as a method by which low surface resistance can be realized at a low cost.

Moreover, this method that uses a coating liquid for forming a transparent conductive layer is much more simple compared to other methods of forming transparent conductive layers, such as vacuum evaporation and sputtering, production cost is also low, and it is very useful for electric field shielding by which CRTs can be treated.

A coating liquid that uses indium tin oxide (ITO) for conductive microparticles is known as the coating liquid for the above-mentioned transparent conductive layer used in this method. However, since surface resistance of the film that is obtained is high at $10^4$ to $10^6$ $\Omega/\square$, a corrective circuit for canceling the electric field is necessary in order to adequately block electric field leakage and therefore, there was a problem in that production cost rises accordingly. On the other hand, transmittance of film from a coating liquid for forming a transparent conductive layer using metal powder as the above-mentioned conductive microparticles is somewhat lower than that from coating liquid that uses ITO, but a film with low resistance of $10^2$ to $10^3$ $\Omega/\square$ is obtained. Consequently, there is an advantage in terms of cost because the above-mentioned corrective circuit is not necessary and this will probably become mainstream in the future.

Moreover, the metal microparticles that are used for the above-mentioned coating liquid for forming a transparent conductive layer are limited to noble metals, such as silver, gold, platinum, rhodium, palladium, etc., which rarely oxidize in air, as shown in Japanese Laid-Open Patent Application No. Hei 8-77832 and Japanese Laid-Open Patent Application No. Hei 9-55175. This is because when metal microparticles other than a noble metal, such as iron, nickel, cobalt, etc., are used, an oxide film always forms on the surface of these metal microparticles in an air ambient atmosphere and good conductivity as a transparent conductive layer is not obtained.

On the other hand, anti-glare treatment is performed on the face panel surface in order to control reflection on the screen and thereby make the display screen easy to see. This anti-glare treatment is done by the method whereby diffused reflection at the surface is increased by making fine irregularities in the surface. However, this method cannot be said to be very desirable because image quality drops due to a reduction in resolution when it is used. Consequently, it is preferred that, instead, anti-glare treatment by the interference method be performed whereby the index of refraction of the transparent film and film thickness are controlled so that there is destructive interference of reflected light on incident light. In order to obtain low-reflection results by this type of interference method, a 2-layered film is generally used wherein optical film thickness of a film with a high index of refraction and a film with a low index of refraction is set at $1/4\lambda$ and $1/4\lambda$ ($\lambda$ is wavelength), respectively, or $1/2\lambda$ and $1/4\lambda$, respectively. Film consisting of the above-mentioned indium tin oxide (ITO) microparticles is also used as this type of film with a high index of refraction.

Furthermore, of the optical constant of metals (n–ik, n: index of refraction, $i^2=-1$, k: extinction coefficient), the value of n is small, but the value of k is very high when compared to ITO, etc., and therefore, even if a transparent conductive layer consisting of metal microparticles is used, the same anti-reflection results as with ITO are obtained by interference with light by film with a 2-layer structure.

The metal microparticles that are used in conventional coating liquids for forming transparent conductive layers are limited to noble metals, such as silver, gold, platinum, rhodium, palladium, etc., as previously mentioned, but when their electrical resistance is compared, specific resistance of platinum, rhodium, and palladium is 10.6, 5.1, and 10.8 $\mu\Omega\cdot$cm, respectively, which is high in comparison to the 1.62 and 2.2 $\mu\Omega\cdot$cm of silver and gold. Therefore, there was an advantage to using silver microparticles and gold microparticles for forming a transparent conductive layer with low surface resistance.

Nevertheless, when silver microparticles were used, there were problems with weather resistance in that there was extreme sulfidation and oxidation and degradation by brine, ultraviolet rays, etc., while when gold microparticles were used, there were none of the above-mentioned problems with weather resistance, but there were the same problems with cost as when platinum microparticles, rhodium microparticles, palladium microparticles, etc., were used.

In light of this technical background, the inventor previously proposed a coating liquid for forming a transparent conductive layer in which noble metal-coated silver microparticles with a mean particle diameter of 1 to 100 nm, wherein of gold or platinum only, or a compound of gold and platinum, is coated on the surface of silver microparticles, are dispersed in place of the above-mentioned silver or gold microparticles, as well as a transparent conductive layered structure that is produced using this coating liquid and a display that uses this layered structure, etc. (refer to Japanese Laid-Open Patent No. Hei 11-203943, Japanese Laid-Open Patent Application No. Hei 11-228872, and Specification of Japanese Patent Application No. Hei 11-366343).

Moreover, when the surface of silver microparticles is coated with gold or platinum only or a compound of gold and platinum, the silver within the noble metal-coated silver microparticles is protected by the gold or platinum only or the compound of gold and platinum and therefore, improvement of weather resistance, chemical resistance, etc., is expected.

Furthermore, the phenomenon is confirmed whereby, during the course of production of transparent conductive layered structures, depending on the heat treatment conditions used for the above-mentioned noble metal-coated silver microparticles with a mean particle diameter of 1 to 100 nm, wherein gold or platinum only or a compound of gold and platinum is coated on the surface of silver microparticles, part of the silver diffuses to inside the coating layer formed from the gold and/or platinum to form an alloy layer and some of this alloy layer is exposed at the surface, resulting in a slight reduction in weather resistance, chemical resistance, etc.

It is also confirmed that this can be avoided by setting the gold and/or platinum content in the above-mentioned noble metal-coated silver microparticles in the range of 50 to 95 wt %.

Furthermore, it is possible to form the alloy layer obtained by the above-mentioned heat treatment on microparticles in a transparent conductive layer composed of silver and gold, etc., and there are cases where the noble-metal coating layer that coats the silver microparticle surface is not composed of only gold and/or platinum as a result of this alloy layer formation. Therefore, in the present specification the above-mentioned microparticles composed of silver and gold, etc., in the transparent conductive layer hereafter are not represented as noble metal-coated silver microparticles, but rather noble metal microparticles.

In addition to the above-mentioned demands for properties of good conductivity, low reflectance, weather resistance, chemical resistance, etc., recently there has also come to be a demand for improved contrast of an image by adjusting transmittance of this type of transparent conductive layered structure to within a prescribed range less than 100% (40 to 75%) in order to make the display screen even easier to see.

Consequently, there is a problem with the conventional transparent conductive layered structures in Japanese Laid-Open Patent Application Nos. Hei 11-203943, Hei 11-228872, and Japanese Patent Application No. Hei 11-366343 in that they cannot meet the above-mentioned demand.

The method disclosed in the above-mentioned specifications whereby a conventional transparent 2-layer film is formed on the surface of a face panel (CRT front panel) with a low transmittance (for instance, 40%~60%) and the method whereby a transparent 2-layer film with a low transmittance is formed on the surface of a face panel with high transmittance can be considered in response to these demands, while the latter method is favorable in terms of the fact that the transmittance of the CRT can be controlled as needed. Furthermore, progress has recently been made in flattening the display surface of CRT displays and the later method, the purpose of which is to make transmittance of a front panel uniform, is necessary in this case as well.

SUMMARY OF THE INVENTION

Therefore, an object of the present invention is to provide a first or second transparent conductive layered structure wherein the transparent conductive layer or the transparent coating layer comprising the above-mentioned transparent 2-layer film has a low transmittance, there is the same good conductivity, low reflectance, and weather resistance, chemical resistance, etc., as in the past, and the visible light transmittance of the transparent 2-layer film is adjusted to within a prescribed range less than 100% (40 to 75%).

Another object of the present invention is to provide a display with which contrast of the display screen is improved and surface reflection of the display screen is reduced, and which has long-term strong electric field shielding effects.

Yet another object of the present invention is to provide a coating liquid for forming a transparent conductive layer that is suitable for the manufacture of the above-mentioned first transparent conductive layered structure.

That is, the first transparent conductive layered structure according to the present invention is a transparent conductive layered structure having a transparent substrate and a transparent 2-layer film consisting of a transparent conductive layer and a transparent coating layer formed in succession on this transparent substrate, wherein the main components of the above-mentioned transparent conductive layer are noble metal microparticles with a mean particle diameter of 1 to 100 nm composed of gold and/or platinum and silver and containing 5 to 95 wt % of the above-mentioned gold and/or platinum, colored pigment microparticles with a mean particle diameter of 5 to 200 nm, and binder matrix, and the above-mentioned noble metal microparticles are mixed at a ratio of 1 to 40 parts by weight per 1 part by weight colored pigment microparticles, the above-mentioned transparent 2-layer film having a surface resistance of 10 to 5,0000 Z$\Omega$/□, a reflectance of the transparent 2-layer film which becomes minimum in the reflection profile of the visible light region being 0 to 2.5%, visible light transmittance of the transparent 2-layer film only not including the above-mentioned transparent substrate being 40 to 75%, and standard deviation of transmittance of only the transparent 2-layer film not including the above-mentioned transparent substrate being 0 t0 5% at each wavelength in 5 nm intervals in the visible light wavelength region (380 to 780 nm).

Moreover, the second transparent conductive layered structure according to the present invention is a transparent conductive layered structure having a transparent substrate and a transparent 2-layer film comprising a transparent conductive layer and transparent coating layer formed in succession on this transparent substrate, wherein the main components of the above-mentioned transparent conductive layer are noble metal microparticles with a mean particle diameter of 1 to 100 nm composed of gold and/or platinum and silver and containing 5 to 95% gold and/or platinum and binder matrix, and the main components of the above-mentioned transparent coating layer are colored pigment microparticles with a mean particle diameter of 5 to 200 nm and binder matrix, the above-mentioned transparent 2-layer film has a surface resistance of 10 to 5,000 $\Omega/\square$, reflectance of the above-mentioned 2-layer film which becomes minimum in the reflection profile of the visible light region being 0 to 2.5%, visible light transmittance of the transparent 2-layer film only not including the above-mentioned transparent substrate being 40 to 75%, and standard deviation in transmittance of the transparent 2-layer film only not including the above-mentioned transparent substrate being 0 to 5% at each wavelength in 5 nm intervals of the visible light wavelength region (380 to 780 nm).

Next, the display according to the present invention is characterized in that it is a display comprising a display main unit and a front panel arranged on the front side of this display main unit, wherein the above-mentioned first or second transparent conductive layered structure is used as the above-mentioned front panel with the transparent 2-layer film side disposed on the outside.

Moreover, the coating liquid for forming a transparent conductive layer according to the present invention used in the production of the above-mentioned first transparent conductive layered structure is a coating liquid for forming a transparent conductive layer of a transparent conductive layered structure having a transparent substrate and a transparent 2-layer film consisting of a transparent conductive layer and a transparent coating layer formed in succession on this transparent substrate, the above-mentioned transparent 2-layer film having a surface resistance of 10 to 5,000 $\Omega/\square$, reflectance of the above-mentioned 2-layer film which becomes minimum in the reflection profile of the visible light region being 0 to 2.5%, and the visible light transmittance of the transparent 2-layer film only not including the above-mentioned transparent substrate being 40 to 75%, while standard deviation of transmittance of the transparent 2-layer film only not including the above-mentioned transparent substrate being 0 to 5% at each wavelength in 5 nm intervals of the visible light wavelength region (380 to 780 nm), wherein the main components of said coating liquid are noble metal-coated silver microparticles with a mean particle diameter of 1 to 100 nm containing 5 to 95 wt % gold and/or platinum, and the surface of which is coated with gold or platinum alone or a compound of gold and platinum, colored pigment microparticles with a mean particle diameter of 5 to 200 nm, and a solvent in which these microparticles are dispersed, and the noble-metal coated silver microparticles are mixed at a ratio of 1 to 40 parts by weight per 1 part by weight of the above-mentioned colored pigment microparticles.

DESCRIPTION OF THE PREFERRED EMBODIMENTS

Figure 1:
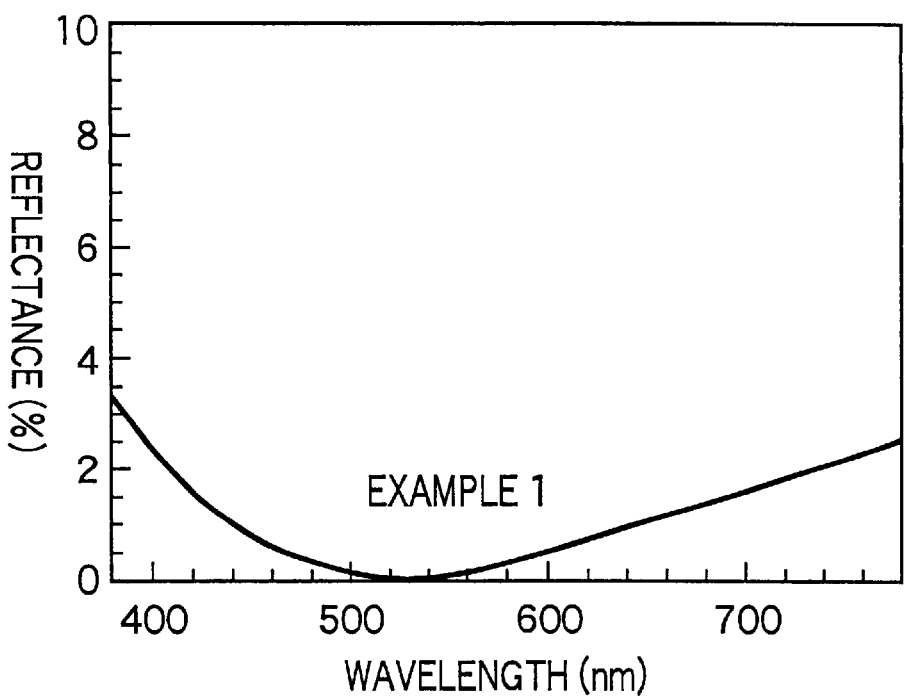
FIG. 1 is a graph showing the reflection profile of the transparent conductive layered structure according to Example 1.

The present invention will now be described in detail:

First, as with the inventions in Japanese Laid-Open Patent Application Nos. Hei 11-203943, Hei 11-228872, and Specification of Japanese Patent Application No. Hei 11-366343, the present invention is based on the concept that because gold and platinum are chemically stable and have excellent weather resistance, chemical resistance, oxidation resistance, etc., chemical stability of silver microparticles can be improved by coating the surface of the same with gold or platinum only or a compound of gold and platinum.

Moreover, since specific resistance of platinum is somewhat higher compared to silver and gold, as previously mentioned, Ag-Au systems are preferred over Ag-Pt systems and Ag-Au-Pt systems in terms of surface resistance of transparent conductive film. However, since gold or platinum only or a compound material of gold and platinum is used as the coating layer on the surface of the above-mentioned silver microparticles, the good conductivity of the silver is not compromised to such an extent that it is below the level of practical use.

Furthermore, the method whereby alloy microparticles are made by making an alloy of silver with gold or platinum or gold and platinum to improve the above-mentioned properties of weather resistance, etc., instead of coating silver microparticles with the above-mentioned gold or platinum only or a compound of gold and platinum is also considered. However, when an aqueous solution of a chloroaurate or a chloroplatinate and a silver salt is used as the starting solution to make the above-mentioned alloy microparticles by the wet method, which is generally used for microparticle preparation, there is a problem in that slightly soluble silver chloride is produced when these are mixed. Moreover, although the above-mentioned problem does not occur when a cyanide complex salt is used as the gold salt, platinum salt, or silver salt, there is a problem in that it becomes necessary to handle toxic cyanide compounds and synthesis of the alloy microparticles of gold or platinum and silver is not easy.

Therefore, by using noble-metal coated silver microparticles wherein gold or platinum only or a compound of gold and platinum is coated on the surface of silver microparticles as metal microparticles used in the coating liquid for forming a transparent conductive layer in the present invention, improvement of properties, such as weather resistance, chemical resistance, etc., of the transparent conductive layer formed using the coating liquid for forming a transparent conductive layer is expected.

Moreover, the present invention uses the method whereby a transparent 2-layer film of low transmittance (40 to 75%) is obtained by adding colored pigment microparticles to either the above-mentioned transparent conductive layer or transparent coating layer for the transparent 2-layer film consisting of a conventional transparent conductive layer and a transparent coating layer.

When the colored pigment microparticles are added to the above-mentioned transparent conductive layer here, the formation of a network structure in the noble metal microparticles is somewhat inhibited (that is, the formation of a conduction path in the noble metal microparticles is inhibited) owing to the presence of the colored pigment microparticles.

Therefore, a transparent 2-layer film of low transmittance (40 to 75%) with which there is not marked compromise of conductivity, is obtained in the present invention by setting the amount of above-mentioned colored pigment microparticles added at such a small amount that the formation of a conduction path in the noble metal microparticles is not inhibited (within a range of 1 to 40 parts by weight noble metal microparticles per 1 part by weight colored pigment microparticles). Consequently, it is important to add noble metal microparticles at a ratio of 1 to 40 parts by weight per 1 part by weight colored pigment microparticles when adding colored pigment microparticles to the above-mentioned transparent conductive layer.

On the other hand, when colored pigment microparticles are added to the above-mentioned transparent coating layer, the part that is responsible for conductivity (transparent conductive layer) and the part that is responsible for low transmission (transparent coating layer) are separate and therefore, it is possible to obtain a transparent 2-layer film of low transmittance (40 to 75%) without compromising conductivity of the above-mentioned transparent conductive layer.

Since there is a small amount of colored pigment microparticles added to the above-mentioned transparent conductive layer, as previously mentioned, or the colored pigment microparticles added to the transparent coating layer have almost no effect on conductivity of the transparent conductive layer, it is not always necessary for the colored pigment microparticles to be conductive and microparticles of carbon, black titanium oxide, black titanium oxynitride, compound oxide pigment, quinacridone pigment, anthraquinone pigment, perylene pigment, isoindolinone pigment, azo pigment, phthalocyanine pigment, cobalt violet, molybdenum orange, ultramarine, Prussian blue, and titanium nitride can be used. However, they are not limited to these as long as they are colored and have a mean particle diameter of 5 to 200 nm.

Moreover, the optical constant (n–ik, n: index of refraction, k: extinction coefficient) of the above-mentioned colored pigment is unclear, but the present invention was successfully completed upon discovering that good low reflection properties are obtained with the first conductive transparent layered structure comprising a transparent 2-layer film consisting of a transparent conductive layer, the main components of which are noble metal microparticles, colored pigment microparticles, and binder matrix, and a transparent coating layer, the main component of which is a binder matrix, that has been formed on a transparent substrate and the second transparent conductive layered structure comprising a transparent 2-layer film consisting of a transparent conductive layer, the main components of which are noble metal microparticles and binder matrix, and a transparent coating layer the main components of which are colored pigment microparticles and binder matrix, that has been formed on a transparent substrate.

Furthermore, the above-mentioned colored pigment microparticles are present in the transparent conductive layer containing noble metal microparticles in the first transparent conductive layered structure wherein the transparent conductive layer has been adjusted to low transmittance. The formation of a network structure in the noble metal microparticles is somewhat inhibited, as previously mentioned, owing to the presence of these colored pigment microparticles. Therefore, conductivity of the transparent conductive layer correspondingly drops somewhat. However, because the colored pigment microparticles are added in a very small amount to the transparent conductive layer as previously mentioned (1 to 40 parts by weight noble metal microparticles per 1 part by weight colored pigment microparticles), practical utility is not compromised. Furthermore, even if weather resistance of the colored pigment microparticles that are used is not good, there will be no problems with weather resistance with the addition of the colored pigment microparticles on the premise that the colored pigment microparticles are protected by the binder matrix of the transparent coating layer formed on the transparent conductive layer.

On the other hand, the transparent coating layer, the main components of which are colored pigment microparticles and binder matrix, is formed on the transparent conductive layer, the main components of which are noble metal microparticles and binder matrix, in the second transparent conductive layered structure wherein the transparent coating layer has been adjusted to low transmittance. Therefore, the colored pigment microparticles in the transparent coating layer have almost no effect on conductivity of the transparent conductive layer, as previously mentioned. Moreover, a small amount of colored pigment microparticles added to the transparent coating layer is sufficient for realizing the above-mentioned low transmittance (40 to 75%), as will be mentioned later. Therefore, even if the weather resistance of the colored pigment microparticles is not very good, there will rarely be a problem with weather resistance with the addition of the colored pigment microparticles because the colored pigment microparticles will be protected by the binder matrix in the transparent coating layer.

It is important here that the noble metal microparticles (noble metal-coated silver microparticles) and colored pigment microparticles according to the present invention must have a mean particle diameter of 1 to 100 nm and 5 to 200 nm, respectively. If the above-mentioned noble metal microparticles (noble metal-coated silver microparticles) are smaller than 1 nm, it will be difficult to produce the microparticles and at the same time, it will also be difficult to disperse them in producing a coating liquid, resulting in practical use impossible. Moreover, if they are larger than 100 nm, there will be an increase in scattering of visible light by the transparent 2-layer film that is formed (in the end, the haze value of the film will increase), making practical use impossible. Furthermore, the mean particle diameter used here represents the mean particle diameter of microparticles observed with a transmission electron microscope. It is important that the above-mentioned colored pigment microparticles be 5 to 200 nm for the same reasons.

Next, the transparent conductive layer comprising the above-mentioned noble metal microparticles composed of gold and/or platinum and silver is formed by heat treatment of the coating liquid for forming a transparent conductive layer after being applied to the transparent substrate. As a result of this heat treatment, part of the noble metal-coated silver microparticles form an alloy, as previously described, or the noble metal-coated silver microparticles themselves bond together with gold or platinum only or a compound of gold and platinum remaining coated on the surface of the silver microparticles, to make the above-mentioned noble metal microparticles. The noble metal microparticles are ideal for electric field shielding and a transparent 2-layer film with a surface resistance of 10 to 5,000 $\Omega/\square$ is obtained in the end. Moreover, the gold and/or platinum content of the above-mentioned noble metal-coated silver microparticles is within a range of 5 to 95 wt %. If the gold and/or platinum content is less than 5 wt %, there are times when the weather resistance of the above-mentioned noble metal microparticles that are formed will be poor, while if it exceeds 95 wt %, there will be little economic advantage to using noble metal-coated silver microparticles.

Furthermore, it is preferred that the gold and/or platinum content of the noble metal-coated silver microparticles be within a range of 50 to 95 wt % in order to avoid the phenomenon whereby the gold, platinum, silver, etc., form an alloy, resulting in a slight reduction in weather resistance and chemical resistance, depending on the above-mentioned heat treatment conditions. If the gold and/or platinum content in the above-mentioned noble metal-coated silver microparticles exceeds 50 wt %, there will be a reduction in the weight ratio of silver in the noble metal microparticles that are formed using this coating liquid for forming a transparent conductive layer, but because the atomic weight of silver is approximately half that of gold and platinum, the reduction in the ratio when compared in terms of molar % is not that great and the effect of the silver on the properties of the noble metal microparticles is still retained.

Next, at least one type or more selected from the previously mentioned carbon, black titanium oxide, black titanium oxynitride, composite oxide pigment (for instance, pigments of black spinel oxide, Ti—Ni oxide, Ti—Sb—Ni oxide, Zn—Fe oxide, Ni—Zn—Co—Ti oxide, Co—Al—Cr—Ti oxide, Co—Al oxide, Cu—Cr—Mn oxide, etc.) quinacridone pigment (for instance, quinacridone red, etc.), anthraquinone pigment (for instance, dianthraquinone red, etc.), perylene pigment, isoindolinone pigment (for instance, isoindolinone yellow, etc.), azo pigment (for instance, permanent red 4R), phthalocyanine pigment (phthalocyanine green, phthalocyanine blue, etc.), cobalt violet, molybdenum orange, ultramarine, Prussian blue, and titanium nitride (TiN) microparticles are used as the colored pigment microparticles.

When titanium nitride microparticles are used as the colored pigment microparticles in particular, there is an advantage in that film with a low transmittance is obtained by adding a smaller amount to the transparent conductive layer or the transparent coating layer because the titanium nitride has better tinting strength than do the above-mentioned black titanium oxide, black titanium oxynitride, black spinel oxide, etc., microparticles.

The above-mentioned black titanium oxide is a titanium sub-oxide($TiO_{2-x}$) obtained by, for instance, treatment of titanium oxide ($TiO_2$) in a hydrogen ambient atmosphere at a high temperature and black titanium oxynitride($Ti_xO_yN_z$) is a titanium compound comprising nitrogen obtained by treatment of titanium oxide ($TiO_2$) at a high temperature in an ammonia ambient atmosphere. Moreover, compound oxides of, for instance, iron, manganese, and copper are black spinel oxides. These have a spinel structure represented by the chemical formula (Cu, Fe, Mn) (Fe, Mn)$_2O_4$ and are made of 33 to 36 wt % CuO, 30 to 51 wt % MnO, and 13 to 35 wt % $Fe_2O_3$. Moreover, the above-mentioned titanium nitride (TiN) microparticles can be obtained by, for instance, the method whereby titanium chloride and ammonia gas are reacted in plasma, the method whereby metallic titanium powder is vaporized and reacted in plasma under a nitrogen ambient atmosphere, etc.

As for the transmitted color of the film, in contrast to the fact that the transparent conductive layer or transparent coating layer to which only carbon microparticles have been applied presents a slightly brown color, in the case of a transparent conductive layer that uses both carbon microparticles and the above-mentioned noble metal microparticles, the transmitted color of the same film is relatively neutral. The reason for this is not clear at present, but is appears to be because the optical constant of the film (n–ik) has an effect in the desired direction when noble metal microparticles and carbon microparticles are used together. Moreover, the transmission profile is similarly flat and the transmitted color is almost neutral in the case of transparent conductive layers that use the above-mentioned titanium nitride, black titanium oxide, black titanium oxynitride, etc.

Silicon oxide-coated colored pigment microparticles the surface of which is coated with silicon oxide can also be used here as these colored pigment particles. When these silicon oxide-coated colored pigment microparticles are used in the transparent conductive layer, improvement of conductivity of the transparent 2-layer film is expected, and when the above-mentioned silicon oxide-coated colored pigment microparticles are used in the transparent coating layer, improvement of mechanical strength of the transparent 2-layer film is expected.

That is, the coating liquid for forming the transparent conductive layer containing colored pigment microparticles is prepared by adding a colored pigment microparticle dispersion in which colored pigment microparticles have been dispersed using a polymer dispersant, a surfactant, etc., to a colloidal dispersion of noble metal-coated silver microparticles.

Moreover, this coating liquid for forming a transparent conductive layer is applied to a transparent substrate and a network structure of the above-mentioned noble-metal coated silver microparticles (noble metal microparticles) is formed during the drying process. However, the formation of a network structure in the noble metal microparticles is inhibited somewhat owing to the presence of the colored pigment microparticles, as previously mentioned, and although it is not to such an extent that practical utility is compromised, there are cases where surface resistance of the transparent 2-layer film increases somewhat. Although the reason is unclear at present, when the above-mentioned silicon oxide-coated colored pigment microparticles are used in this case, the formation of the above-mentioned network structure is rarely inhibited and the surface resistance of the transparent 2-layer film can be kept low, even if a relatively large amount of silicon-coated colored pigment microparticles is added.

When these silicon oxide-coated colored pigment microparticles are used in the transparent coating layer, the bond between the colored pigment microparticles and binder matrix in the transparent coating layer is strengthened by the above-mentioned silicon oxide-coated layer and therefore, it is possible to improve mechanical strength of the transparent 2-layer film.

The amount of coating with silicon oxide in the above-mentioned silicon oxide-coated colored pigment microparticles can be set within a range of 5 to 100 parts by weight per 100 parts by weight colored pigment microparticles. The coating effect with silicon oxide is insufficient if there is less than 5 parts by weight. On the other hand, if more than 100 parts by weight are used, there will be cases in which there is a reduction in the colored pigment in the silicon oxide-coated colored pigment microparticles, resulting in it being necessary to add a correspondingly large amount of the silicon oxide-coated colored pigment microparticles and surface resistance of the transparent 2-layer film increasing slightly.

Next, the first coating liquid for forming the transparent conductive layer containing noble metal-coated silver microparticles and colored pigment microparticles (silicon oxide-coated colored pigment microparticles) and used in the production of the first transparent conductive layered structure and the second coating liquid for forming the transparent conductive layer containing noble metal-coated silver microparticles and used in the production of the second transparent conductive layered structure can be made by the following method:

First, a colloidal dispersion of silver microcparticles is prepared by a conventional method (for instance, the Carey-Lea method, Am. J. Sci., 37, 47 (1889), Am. J. Sci., 38 (1889)).

That is, a colloidal dispersion of silver microparticles (Ag: 0.1 to 10 wt %) is simply prepared by adding and reacting a mixture of aqueous iron sulfate (II) solution and an aqueous sodium citrate solution with an aqueous silver nitrate solution, filtering and washing the precipitate, and then adding purified water. This method of preparing a colloidal dispersion of silver microparticles can be any method as long as silver microparticles with a mean particle diameter of 1 to 100 nm are dispersed and is not restricted to this method.

A reducing agent is added to the colloidal dispersion of silver microparticles thus obtained and then an alkali metal aurate solution or an alkali metal platinate solution is further added to this, or an alkali metal aurate solution and an alkali metal platinate solution are added or mixed solution of an alkali metal aurate and an alkali metal platinate is added, to coat the surface of the above-mentioned silver microparticles with gold or platinum only, or a compound of gold and platinum, and obtain a colloidal dispersion of noble-metal coated silver microparticles.

When necessary, a small amount of dispersant can be added to at least one of the colloidal dispersion of silver microparticles, the alkali metal aurate solution, the alkali metal platinate solution, or the mixed solution of an alkali metal aurate and an alkali metal platinate during the noble metal-coated silver microparticle preparation process.

Moreover, the reaction whereby gold or platinum only, or a compound of gold and platinum is coated on the surface of silver microparticles during the above-mentioned noble metal-coated silver microparticle preparation process occurs because large amounts of fine silver microparticles are already present in the liquid when gold and platinum are produced as a result of reducing the aurate and the platinate and therefore, growth on the surface proceeds under conditions that are more advantageous in terms of energy with the silver microparticles as the nucleus than nucleation (homogenous nucleation) with gold or platinum only. Consequently, because it is presumed that large amounts of fine silver microparticles are present in the liquid when the gold and platinum are produced by reduction of the aurate or platinate, it is preferred that the timing with which the aurate solution or platinate solution, or the aurate solution and platinate solution or their mixture and the above-mentioned reducing agent are added during the noble metal-coated silver microparticle preparation process be adjusted so that at least the above-mentioned reducing agent is added before adding the aurate solution or the platinate solution, the aurate solution and platinate solution or their mixture. That is, when the reducing agent and the aurate solution or platinate solution, the reducing agent and the aurate solution and platinate solution, or the reducing agent and the mixed solution of aurate and platinate are added to the colloidal dispersion of silver microparticles in the state they are mixed, gold and platinum are produced by reduction of the aurate and platinate during. the step whereby the aurate solution or platinate solution, the aurate solution and platinate solution, or the mixed solution of aurate and platinate is mixed with the above-mentioned reducing agent, and nucleation (homogenous nucleation) of the gold and platinum occurs separately. Therefore, a reaction does not occur whereby gold or platinum only or a compound of gold and platinum is coated on the silver microparticle surface, even if the aurate solution, platinate solution, etc., and the reducing agent are added to the colloidal dispersion of silver microparticles after they are mixed.

Furthermore, hydrazine ($N_2H_4$), borohydrides, such as sodium borohydride ($NaBH_4$), etc., and formaldehyde, etc., can be used as the above-mentioned reducing agent. Any reducing agent can be used and it is not limited to these as long as aggregation of the silver microparticles does not occur when it is added to the colloidal dispersion of silver microparticles and it can reduce aurate and platinate to gold and platinum.

For instance, the reduction reaction when potassium aurate [$KAu(OH)_4$] and potassium platinate [$K_2Pt(OH)_6$] are reduced with hydrazine or sodium borohydride is as shown by the following formulas, respectively:

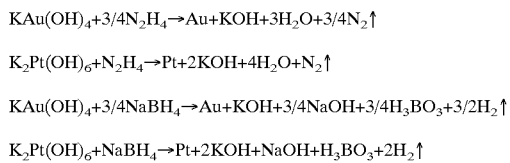

When the above-mentioned sodium borohydride is used as the reducing agent here, there is an increase in the concentration of electrolyte produced by the reduction reaction, as can be confirmed by the above-mentioned reaction formulas, and therefore, the microparticles easily aggregate, as will be described later. Thus, there are inconveniences in that the amount added as a reducing agent is limited and the silver concentration of the colloidal dispersion of the silver microparticles that is used cannot be increased.

On the other hand, when the above-mentioned hydrazine is used as the reducing agent, little electrolyte is produced by the reduction reaction, as can be confirmed from the above-mentioned reaction formulas, and therefore, it is a better reducing agent.

Furthermore, the reduction reaction by hydrazine is as shown below when a salt other than an alkali metal aurate or an alkali metal platinate, such as chloroauric acid ($HAuCl_4$), chloroplatinic acid ($H_2PtCl_6$), or chloroaurate ($NaAuCl_4$, $KAuCl_4$, etc.) or chloroplatinate ($Na_2PtCl_6$, $K_2PtCl_6$, etc.) is used as the coating starting material for gold and platinum:

$$XAuCl_4+3/4N_2H_4 \rightarrow Au+XCl+3HCl+3/4N_2\uparrow$$

$$X_2PtCl_6+N_2H_4 \rightarrow Pt+2XCl+4HCl+N_2\uparrow$$

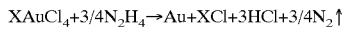

When chloroauric acid, etc., is used in this way, there is not only an increase in the electrolyte concentration with the reduction reaction, but also the production of chlorine ions when compared to when the above-mentioned aurate and platinate are used. Therefore, these chlorine ions react with the silver microparticles to produce slightly soluble silver chloride. As a result, it is difficult to use these for the starting material of the coating liquid for forming a transparent conductive layer according to the present invention.

The electrolyte concentration contained in the colloidal dispersion of noble metal-coated silver microparticles obtained as previously described is then preferably reduced by desalting treatment methods, such as osmosis, electroosmosis, ion exchange, ultrafiltration, etc. This is because the colloid will generally aggregate with the electrolyte if the electrolyte concentration is not reduced. This phenomenon is known as the Schulze-Hardy rule.

Next, the desalted colloidal dispersion of noble metal-coated silver microparticles is concentrated to obtain a concentrated dispersion of noble metal-coated silver microparticles and then the colored pigment microparticle (silicon oxide-coated colored pigment microparticle) dispersion and solvent are mixed, or an inorganic binder is further added and mixed and the components are adjusted (microparticle concentration, water concentration, etc.) to obtain the first coating liquid for forming a transparent conductive layer used in the production of the first transparent conductive layered structure.

Moreover, a concentrated dispersion of noble metal-coated silver microparticles is obtained by concentration of the above-mentioned desalted colloidal dispersion of noble metal-coated silver microparticles. Then solvent only, or solvent containing inorganic binder, is added to this concentrated dispersion of noble metal-coated silver microparticles and the components are adjusted (microparticle concentration, water concentration, etc.) to obtain the second coating liquid for forming a transparent conductive layer used in the production of the second transparent conductive layered structure.

When ultrafiltration is used as the above-mentioned desalting method, this ultrafiltration also has a concentrating effect, as will be described later, and therefore, it is possible to simultaneously proceed with both desalting and concentration. Consequently, the order of desalting and concentration of the colloidal dispersion in which noble metal-coated silver microparticles are dispersed is selected as needed based on the treatment method used and simultaneous treatment is also possible when ultrafiltration, etc., is used.

In addition, the above-mentioned solvent can be substituted for the solvent contained in the concentrated dispersion of noble metal-coated silver microparticles or the colored pigment microparticle (silicon oxide-coated colored pigment microparticle) dispersion (that is, the use of a solvent alone can be omitted). Moreover, the inorganic binder can be added and mixed as is, or the concentrated dispersion of noble metal-coated silver microparticles, colored pigment microparticle (silicon oxide-coated colored pigment mcroparticle) dispersion or solvent containing the inorganic binder can be added. Any mixing method is used.

Furthermore, the above-mentioned colored pigment microparticle dispersion can be obtained by mixing the colored pigment microparticles with dispersant and solvent, performing dispersion up to a dispersed particle diameter of 5 to 200 nm using a dispersion device, such as paint shaker, sand mill, ultrasonic disperser, etc., and then reducing the electrolyte concentration of the dispersion (desalting) by ion exchange, etc.

Moreover, the above-mentioned silicon oxide-coated colored pigment microparticle dispersion can be obtained by (1) the method whereby silicon oxide-coated colored pigment microparticles, the surface of which has been precoated with silicon oxide, are mixed with dispersant and solvent, dispersion is performed up to a dispersed particle diameter of 5 to 200 nm using a dispersion device such as a paint shaker, sand mill, ultrasonic disperser, etc., and then the electrolyte concentration of the dispersion is reduced (desalting) by ion exchange, etc., (2) the method whereby the above-mentioned colored pigment microparticles are mixed with alkyl silane, such as tetraethoxysilane, etc., or silica sol of hydrolyzed alkyl silane, and solvent, dispersion is performed up to a dispersed particle diameter of 5 to 200 nm using the above-mentioned dispersion device, and then desalting is performed, (3) the method whereby the above-mentioned colored pigment microparticles are mixed with a dispersant and solvent and dispersed up to a dispersed particle diameter of 5 to 200 nm using the above-mentioned dispersion device, silica sol is added and coating with silicon oxide is performed by agitation or ultrasonic treatment, and then desalting, etc.

The basis for coating the silver microparticle surface with gold or platinum only or a compound of gold and platinum in the above-mentioned coating liquid for forming a transparent conductive layer is that there are not marked changes in particle diameter before and after coating with gold or platinum only or a compound of gold and platinum and that the gold or platinum only or the gold or platinum compound is uniformly distributed to each particle is technically confirmed by particle observation with a transmission electron microscope (TEM) and component analysis (EDX: energy diffusive X-ray analyzer) and further, from the coordination number of the gold or platinum only or compound of gold and platinum by EXAFS (extended X-ray absorption fine structure).

Furthermore, a variety of coated forms of a compound of gold and platinum on the silver microparticle is considered depending on whether an aurate solution and a platinate solution or mixed solution of an aurate and a platinate was used during the process of coating with a compound of gold and platinum (that is, the noble metal-coated silver microparticle preparation process) and depending on the timing of adding these solutions and the concentration of aurate and platinate used, etc. That is, all or part of the surface of silver microparticles can be coated with gold and this entire unit can be coated with platinum, or all of part of the surface of the silver microparticles can be coated with platinum and this entire unit can be coated with gold, depending on the conditions, or a form is considered where the entire surface of the silver microparticles is coated with platinum and gold alone without overlapping one another or as an alloy.

When baking is performed during the course of formation of the transparent conductive layer under heat treatment conditions of, for instance, 200° C., an alloy layer can form by thermal diffusion of the gold, platinum, silver, etc., within the conductive microparticles of the transparent conductive layer formed using the above-mentioned coating liquid for forming a transparent conductive layer, as previously mentioned, but the details are not clear.

Consequently, the above-mentioned conductive microparticles composed of silver and gold, etc., in the transparent conductive layer are represented not as noble metal-coated silver microparticles, but rather noble metal microparticles in the present specification, as previously mentioned.

Moreover, concentration of the above-mentioned colloidal dispersion of noble metal-coated silver microparticles can be performed by an ordinary method, such as with a reduced-pressure evaporator, by ultrafiltration, etc. Moreover, the water content of the coating liquid for forming a transparent conductive layer should be 1 to 50 wt %. If it exceeds 50 wt %, there are cases where cissing due to the high surface tension of the water will easily occur during drying after the coating liquid for forming a transparent conductive layer has been applied to the transparent substrate.

The above-mentioned problem with cissing can be solved by adding surfactant to the coating liquid for forming a transparent conductive layer. However, another problem occurs in that application defects are readily produced with the addition of surfactant. Consequently, the water concentration of the coating liquid for forming a transparent conductive layer is preferably 1 to 50 wt %.

Moreover, there are no special restrictions to the above-mentioned solvent and it is selected as needed based on the application method and film production conditions. Examples are alcohol solvents, such as methanol, ethanol, isopropanol, butanol, benzyl alcohol, diacetone alcohol, etc., ketone solvents, such as acetone, methyl ethyl ketone (MEK), methyl isobutyl ketone (MIBK), cyclohexanone, isophorone, etc., glycol derivatives, such as propylene glycol methyl ether, propylene glycol ethyl ether, etc., formamide, N-methyl formamide, dimethyl formamide (DMF), dimethyl acetamide, dimethyl sulfoxide (DMSO), N-methyl-2-pyrrolidone (NMP), etc., but it is not limited to these.

Next, the first or second transparent conductive layered structure, the majority of which is composed of a transparent substrate and a transparent 2-layer film consisting of a transparent conductive layer formed on this transparent substrate and a transparent coating layer formed on top of this, can be obtained using the first or second coating liquid for forming a transparent conductive layer obtained in this way.

Formation of the above-mentioned transparent 2-layer film on the transparent substrate can be performed by the following method:

First, the first coating liquid for forming a transparent conductive layer, the main components of which are solvent, noble metal-coated silver microparticles with a mean diameter of 1 to 100 nm, and colored pigment microparticles (silicon oxide-coated colored pigment microparticles) with a mean particle diameter of 5 to 200 nm, is applied to a transparent substrate, such as a glass substrate, plastic substrate, etc., by a means such as spray coating, spin coating, wire bar coating, doctor blade coating, gravure coating, roll coating, etc., and then dried as needed. Then the coating liquid for forming a transparent coating layer whose main component is, for instance, silica sol, etc., is overcoated by the above-mentioned means. Next, after overcoating, heat treatment is performed at a temperature of, for instance, 50 to 350° C., to cure the coating liquid for forming a transparent coating layer and form the above-mentioned transparent 2-layer film. Furthermore, the mixture ratio of colored pigment microparticles (silicon oxide-coated colored pigment microparticles) and noble metal-coated silver microparticles in the above-mentioned coating liquid for forming a transparent conductive layer is 1 to 40 parts by weight above-mentioned noble metal-coated silver microparticles per 1 part by weight colored pigment microparticles (silicon oxide-coated colored pigment microparticles), as previously mentioned. If the amount of colored pigment microparticles (silicon oxide-coated colored pigment microparticles) added is too little, transmittance will be too high and cannot be adjusted to the above-mentioned prescribed range (40 to 75%), while if the amount added is too much, there will simultaneously be a reduction in transmittance and inhibition of conductivity of the transparent 2-layer film for the above-mentioned reasons.

On the other hand, the second coating liquid for forming a transparent conductive layer, the main components of which are solvent and noble metal-coated silver microparticles with a mean diameter of 1 to 100 nm, is applied to a transparent substrate, such as a glass substrate, plastic substrate, etc., by a means such as spray coating, spin coating, wire bar coating, doctor blade coating, gravure coating, roll coating, etc., and then dried as needed. Then the coating liquid for forming a transparent coating layer, the main components of which are colored pigment microparticles (silicon oxide-coated colored pigment microparticles) with a mean particle diameter of 5 to 200 nm and, for instance, silica sol, etc., is overcoated by the above-mentioned means. Next, after overcoating, heat treatment is performed at a temperature of, for instance, 50 to 350° C., to cure the coating liquid for forming a transparent coating layer and form the above-mentioned transparent 2-layer film. Furthermore, the mixture ratio of colored pigment microparticles (silicon oxide-coated colored pigment microparticles) and silica sol in the above-mentioned coating liquid for forming a transparent coating layer is preferably silica sol ($SiO_2$)/colored pigment microparticles (silicon oxide-coated colored pigment microparticles)=2 to 50 (weight ratio). If the amount of colored pigment microparticles (silicon oxide-coated colored pigment microparticles) added is too little, transmittance will be too high and cannot be adjusted to the above-mentioned prescribed range (40 to 75%), while the amount added is too much, there will simultaneously be a reduction in transmittance and inhibition of conductivity of the transparent 2-layer film.

Although there are no problems here with the above-mentioned heat treatment at 50 to 350° C. because the noble metal-coated silver microparticles are protected by gold or platinum alone or a compound of gold and platinum, if the silver microparticles are not coated with gold or platinum, surface resistance will rise due to oxidation and diffusion and degradation of the film will occur when temperature exceeds 200° C.

Moreover, when the transparent 2-layer film of the first transparent conductive layered structure is formed using the first coating liquid for forming a transparent conductive layer, improvement of conductivity, improvement of strength, and even further improvement of weather resistance can be simultaneously accomplished because when the coating liquid for forming a transparent coating layer whose main component is, for instance silica sol, etc., is overcoated by the above-mentioned method, the overcoated silica sol (this silica sol becomes the binder matrix whose main component is silicon oxide with the above-mentioned heat treatment) seeps into the spaces in the noble metal-coated silver microparticles and colored pigment microparticles (silicon oxide-coated colored pigment microparticles) of the transparent conductive layer formed from the coating liquid for forming a transparent conductive layer, the main components of which are solvent and noble metal-coated silver microparticles and colored pigment microparticles (silicon oxide-coated colored pigment microparticles), that has been pre-applied. Furthermore, the index of refraction n of the optical constant (n–ik) of the transparent conductive layer, wherein noble metal-coated silver microparticles and colored pigment microparticles (silicon oxide-coated colored pigment microparticles) are dispersed in the above-mentioned binder matrix whose main component is silicon oxide, is not very large, but the extinction coefficient k is high and therefore, reflectance of the transparent 2-layer film can be markedly reduced with the above-mentioned transparent 2-layer film structure of the above-mentioned transparent conductive layer and transparent coating layer.

On the other hand, when the transparent 2-layer film of the second transparent conductive layered structure is formed using the second coating liquid for forming a transparent conductive layer, improvement of strength, and even further improvement of weather resistance can be simultaneously accomplished because when the coating liquid for forming a transparent coating layer, the main components of which are colored pigment microparticles (silicon oxide-coated microparticles) with a mean particle diameter of 5 to 200 nm and, for instance, silica sol, etc., is overcoated by the above-mentioned method, the overcoated silica sol containing colored pigment microparticles (silicon oxide-coated pigment microparticles) [this silica sol becomes the binder matrix whose main component is silicon oxide comprising colored pigment microparticles (silicon oxide-coated colored pigment microparticles) with the above-mentioned heat treatment] seeps into the spaces in the noble metal-coated silver microparticle layer formed from the coating liquid for forming a transparent conductive layer, the main components of which are solvent and noble metal-coated silver microparticles, that has been pre-applied. However, the size of the spaces in the noble metal-coated silver microparticle layer appears to be the same as the size of the microparticles themselves and therefore, it appears that almost all of what seeps into the above-mentioned spaces during overcoating the coating liquid for forming a transparent coating layer is silica sol, which has a much smaller particle size, and little of the colored pigment microparticles (silicon oxide-coated colored pigment microparticles) seep into the spaces. Furthermore, the index of refraction n of the optical constant (n–ik) of the transparent conductive layer, the main components of which are noble metal microparticles with a mean particle diameter of 1 to 100 nm and binder matrix, that has been formed by baking the above-mentioned noble metal-coated silver microparticles and the transparent coating layer, the main components of which are colored pigment microparticles (silicon oxide-coated colored pigment microparticles) and inorganic binder, such as silica sol, etc., is unclear, but reflectance of the transparent 2-layer film can be markedly reduced with the above-mentioned transparent 2-layer film structure of the above-mentioned transparent conductive layer and transparent coating layer.

A polymer, etc., wherein hydrolysis and dehydropolycondensation have proceeded by adding water and acid catalyst to an ortho-alkyl silicate, or a polymer in which hydrolysis and dehydropolycondensation have proceeded with a commercial alkyl silicate solution already polymerized to a tetramer or pentamer, etc., can be used as the above-mentioned silica sol. Furthermore, when dehydropolycondensation proceeds, solution viscosity rises until it finally hardens and therefore, the degree of dehydropolycondensation is adjusted to no more than the upper limit of viscosity with which it can be applied to a transparent substrate, such as a glass substrate or a plastic substrate. There are no special restrictions to the degree of dehydropolycondensation as long as it is at a level no greater than the above-mentioned upper limit of viscosity, but 500 to 3,000 by weight-average molecular weight is preferred taking into consideration film strength and weather resistance.

Moreover, the dehydropolycondensation reaction of the alkyl silicate hydrolyzed polymer is all but complete when heating and baking of the transparent 2-layer film are performed to obtain a hard silicate film (film whose main component is silicon oxide). Furthermore, it is also possible to add magnesium fluoride microparticles, alumina sol, titania sol, zirconia sol, etc., in order to adjust the index of refraction of the transparent coating layer and change the reflectance of the transparent 2-layer film. A compound containing mercapto groups, such as γ-mercaptopropyl trimethoxysilane, etc., can also be added to the silica sol. Since mercapto groups (SH groups) form a relatively strong bond with gold, when used with noble metal microparticles containing gold, there is improvement of interface strength between the noble metal microparticles and binder matrix and film strength and weather resistance are improved.

Moreover, it is also possible to make the above-mentioned first or second coating liquid for forming the transparent conductive layer by adding silica sol as the inorganic binder component that comprises the binder matrix of the transparent conductive layer in addition to solvent and noble metal-coated silver microparticles with a mean particle diameter of 1 to 100 nm and colored pigment microparticles with a mean particle diameter of 5 to 200 nm dispersed in this solvent, or in addition to solvent and noble metal-coated silver microparticles with a mean particle diameter of 1 to 100 nm dispersed in this solvent. In this case as well, the same transparent 2-layer film is obtained by applying the first or second coating liquid for forming a transparent conductive layer comprising silica sol, drying when necessary and then overcoating coating liquid for forming the transparent coating layer by the above-mentioned means.

Thus, the first or second transparent conductive layered structure according to the present invention has good conductivity and low reflectance and its visible light transmittance is adjusted to within a prescribed range (40 to 75%). Therefore, it can be used in the front panel, etc., of displays, such as the above-mentioned Braun tube (CRT), plasma display panel (PDP), vacuum fluorescent display (VFD), field emission display (FED), electroluminescence display (ELD), liquid crystal display (LCD), etc.

Moreover, by means of the display according to the invention, the first or second transparent conductive layered structure is used as the front panel with the its transparent 2-layer film side on the outside and therefore, contrast is improved and it has an anti-static effect and electric field shielding effect, as well as the effect of being able to reduce surface reflection of the display screen.

Furthermore, the coating liquid for forming a transparent conductive layer according to the present invention has the effect of being able to produce a transparent conductive layered structure having the many properties of good conductivity, low reflectance, and weather resistance, chemical resistance, etc., and the visible light transmittance of the transparent 2-layer film of which has been adjusted to a prescribed range less than 100% (40 to 75%).

Examples of the present invention will now be described in specific terms, but the present invention is not limited to these examples. Moreover, the "%" in the text is "wt %" with the exception of the "%" of transmittance, reflectance, and haze value, and the "parts" are "parts by weight".

EXAMPLE 1

A colloidal dispersion of silver microparticles was prepared by the above-mentioned Carey-Lea method.

Specifically, after adding a mixture of 39 g aqueous 23% iron sulfate (II) solution and 48 g aqueous 37.5% sodium citrate solution to 33 g aqueous 9% silver nitrate solution, the precipitate was filtered and washed and then purified water was added to prepare a colloidal dispersion of silver microparticles (Ag: 0.15%). Next, 8.0 g aqueous 1% hydrazine monohydrate ($N_2H_4 \cdot H_2O$) solution was added to 60 g of this colloidal dispersion of silver microparticles and then a mixture of 480 g aqueous potassium aurate [$KAu(OH)_4$] solution (Au: 0.075%) and 0.2 g aqueous 1% polymer dispersant solution were added while agitating to obtain a colloidal dispersion of gold-coated silver microparticles coated with gold only. This colloidal dispersion of gold-coated silver microparticles was desalted with an ion exchange resin (Mitsubishi Chemical Corporation, brand name: Diaion SK1B, SA20AP) and then concentrated by ultrafiltration to obtain a concentrated dispersion of gold-coated silver microparticles (liquid A).

Next, 5 g carbon microparticles (MA7, Mitsubishi Chemical Corporation) and 0.25 g dispersant were mixed with 44.75 g water and 50 g ethanol and dispersed together with zirconia beads using a paint shaker. The product was then desalted with the above-mentioned ion exchange resin to obtain a carbon microparticle dispersion (liquid B) with a dispersed particle diameter of 85 nm.

A first coating liquid for forming a transparent conductive layer (0.08% Ag, 0.32% Au, 0.05% carbon, 11.2% water, 73.3% EA, 15.0% DAA) was obtained by adding liquid B, ethanol (EA), and diacetone alcohol (DAA) to liquid A. As a result of observing the coating liquid for forming a transparent conductive layer that was obtained with a transmission electron microscope, mean particle diameter of the gold-coated silver microparticles and the carbon microparticles was 6.0 nm and 34 nm, respectively.

Next, this coating liquid for forming a transparent conductive layer was spin coated (150 rpm, 120 seconds) on a glass substrate (soda lime glass with a thickness of 3 mm) heated to 40° C. and then silica sol was spin coated (150 rpm, 60 seconds). The product was further cured for 20 minutes at 180° C. to obtain a glass substrate with a transparent 2-layer film consisting of a transparent conductive layer comprising noble metal microparticles, colored pigment microparticles and binder matrix of silicon oxide and a transparent coating layer comprising silicate film the main component of which is silicon oxide, that is, the transparent conductive layered structure according to Example 1.

The above-mentioned silica sol here was obtained by adding 0.02 g γ-mercaptopropyl trimethoxysilane to 100 g of liquid C. The above-mentioned liquid C was prepared using 19.6 parts methyl silicate 51 (Colcoat Co., Ltd., brand name), 57.8 parts ethanol, 7.9 parts aqueous 1% nitric acid solution, and 14.7 parts purified water to obtain a substance with an $SiO_2$ (silicon oxide) solid concentration of 10% and a weight-average molecular weight of 1,730, which was diluted with a mixture of isopropyl alcohol (IPA) and n-butanol (NBA) (IPA/NBA=3/1) to a final $SiO_2$ solid concentration of 0.8%.

Moreover, the film properties (visible light transmittance, standard deviation of transmittance, haze value, bottom reflectance/bottom wavelength, surface resistance) of the transparent 2-layer film formed on the glass substrate are shown in Table 1b below.

The above-mentioned bottom reflectance means the minimum reflectance in the reflection profile of the transparent conductive layered structure and the bottom wavelength means the wavelength at which reflectance is at a minimum.

Figure 2:
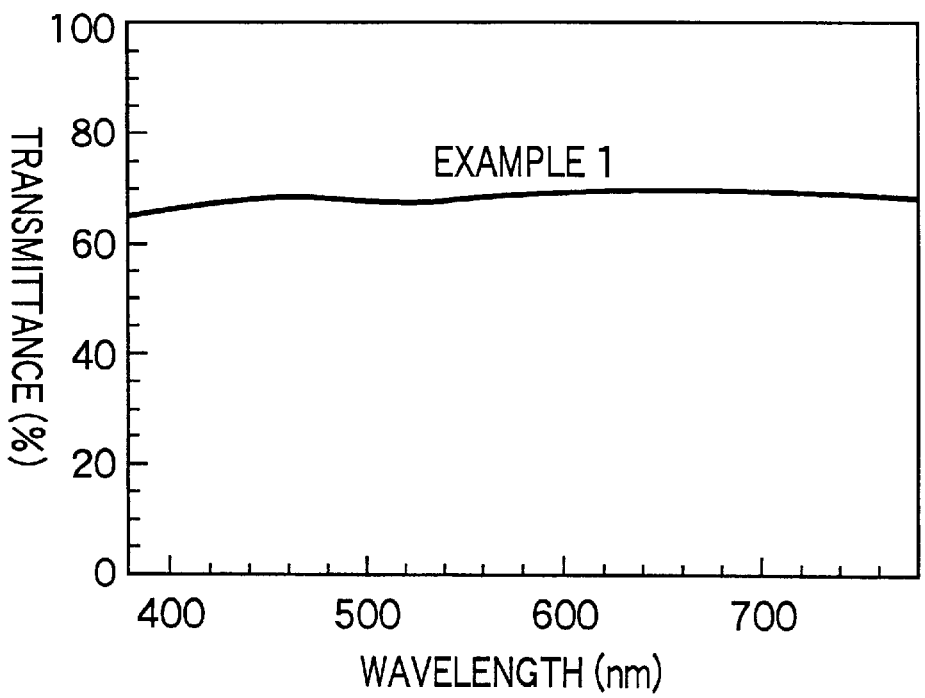
FIG. 2 is a graph showing the transmission profile of the transparent conductive layered structure according to Example 1.

In addition, the reflection profile of the transparent conductive layered structure according to Example 1 that was produced is shown in FIG. 1 and the transmission profile is shown in FIG. 2.

Transmittance of the transparent 2-layer film not including the transparent substrate (glass substrate) at each wavelength in 5 nm intervals of the visible light wavelength region (380 to 780 nm) in Table 1b is found as shown below. That is, transmittance (%) of transparent 2-layer film not including transparent substrate (%)=[(transmittance determined with transparent substrate)/(transparent substrate transmittance)]×100.

Unless otherwise stated, the transmittance and transmission profile of the transparent 2-layer film not including the transparent substrate are used for the transmittance and transmission profile in the present specification.

Furthermore, film thickness of the transparent 2-layer film formed on a transparent substrate (glass substrate) in each example and comparative example was measured by observation of the film cross section with the above-mentioned TEM and was within a range of 25 to 100 nm for the transparent conductive layers and a range of 40 to 80 nm for the transparent coating layers.

Moreover, surface resistance of the transparent 2-layer film was determined using the surface resistance meter (Loresta AP MCP-T400) made by Mitsubishi Chemical Corporation. The haze value and visible light transmittance were measured using a haze meter (HR-200) made by Murakami Color Research Laboratory. Reflectance and the reflection and transmission profiles were measured using a spectrophotometer (U-4000) made by Hitachi, Ltd. In addition, particle diameter of the gold-coated silver microparticles and colored pigment microparticles was evaluated with a transmission electron microscope made by JEOL, Ltd.

EXAMPLE 2

Ten grams of composite oxide microparticles of iron, manganese and copper (TMB#3550, Dainichiseika Color & Chemicals Mfg. Co., Ltd.) and 0.5 g dispersant were mixed with 89.5 g diacetone alcohol and dispersed with zirconia beads using a paint shaker. The product was then desalted with an ion exchange resin to obtain a dispersion of composite oxide microparticles of iron, manganese, and copper with a dispersed particle diameter of 98 nm (liquid D).

Other than the fact that a first coating liquid for forming a transparent conductive layer (0.08% Ag, 0.32% Au, 0.15% Fe—Mn—Cu—O, 10.7% water, 73.7% EA, and 15.0% DAA) was obtained using liquid D in place of liquid B and liquid C was used as the silica sol liquid, a glass substrate with a transparent 2-layer film consisting of a transparent conductive layer comprising noble metal microparticles, colored pigment microparticles, and binder matrix of silicon oxide and a transparent coating layer comprising silicate film the main component of which is silicon oxide, that is, the transparent conductive layered structure according to Example 2, was obtained as in Example 1.

Figure 3:
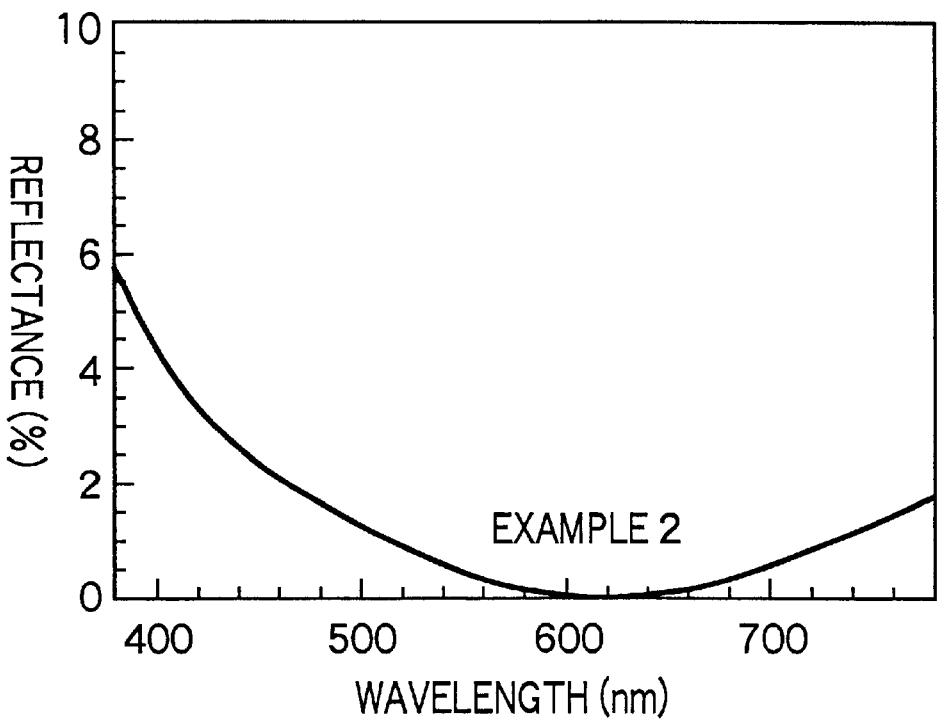
FIG. 3 is a graph showing the reflection profile of the transparent conductive layered structure according to Example 2.
Figure 4:
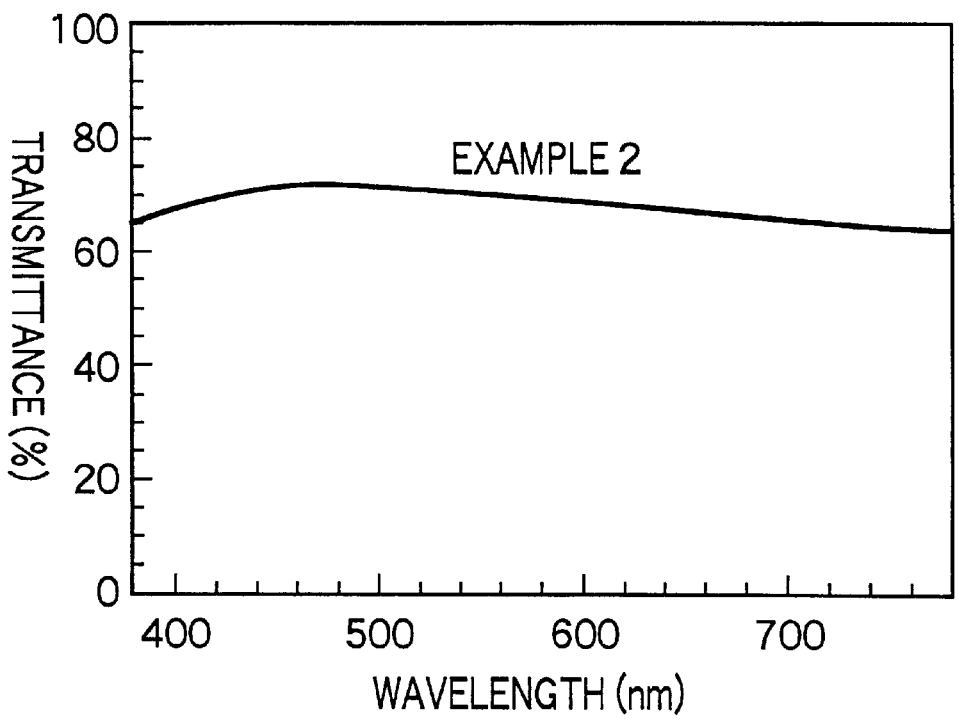
FIG. 4 is a graph showing the transmission profile of the transparent conductive layered structure according to Example 2.

Moreover, film properties of the transparent 2-layer film formed on the glass substrate are shown in the following Table 1b. In addition, the reflection profile of the transparent conductive layered structure according to Example 2 that was produced is shown in FIG. 3 and the transmission profile is shown in FIG. 4.

EXAMPLE 3

Titanium chloride was hydrolyzed with an aqueous alkali solution and the titanium hydroxide that was obtained was treated at 800° C. in ammonia gas to obtain black titanium oxynitride microparticles (15.5% nitrogen) with a mean particle diameter of 30 nm. Five grams of these black titanium oxynitride microparticles and 0.5 g dispersant were mixed with 94.5 g ethanol and dispersed together with zirconia beads using a paint shaker. The product was then desalted with an ion exchange resin to obtain a black titanium oxynitride microparticle dispersion with a dispersed particle diameter of 93 nm (liquid E, 5% black titanium oxynitride).

Other than the fact that a first coating liquid for forming a transparent conductive layer (0.08% Ag, 0.32% Au, 0.1% $Ti_xO_yN_z$, 10.7% water, 73.8% EA, and 15.0% DAA) was obtained using liquid E in place of liquid B, liquid C was used as the silica sol liquid, and the liquid was spin coated on a glass substrate which had been heated to 35° C., a glass substrate with a transparent 2-layer film consisting of a transparent conductive layer comprising noble metal microparticles, colored pigment microparticles and binder matrix of silicon oxide, and a transparent coating layer comprising a silicate film the main component of which is silicon oxide, that is, the transparent conductive layered structure according to Example 3, was obtained as in Example 1.

Figure 5:
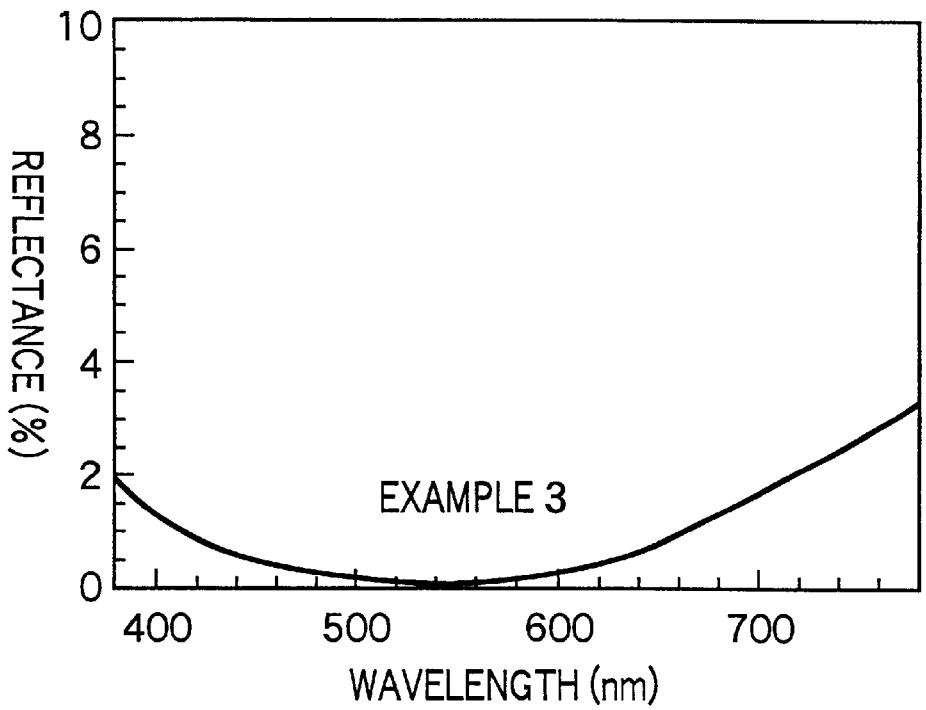
FIG. 5 is a graph showing the reflection profile of the transparent conductive layered structure according to Example 3.
Figure 6:
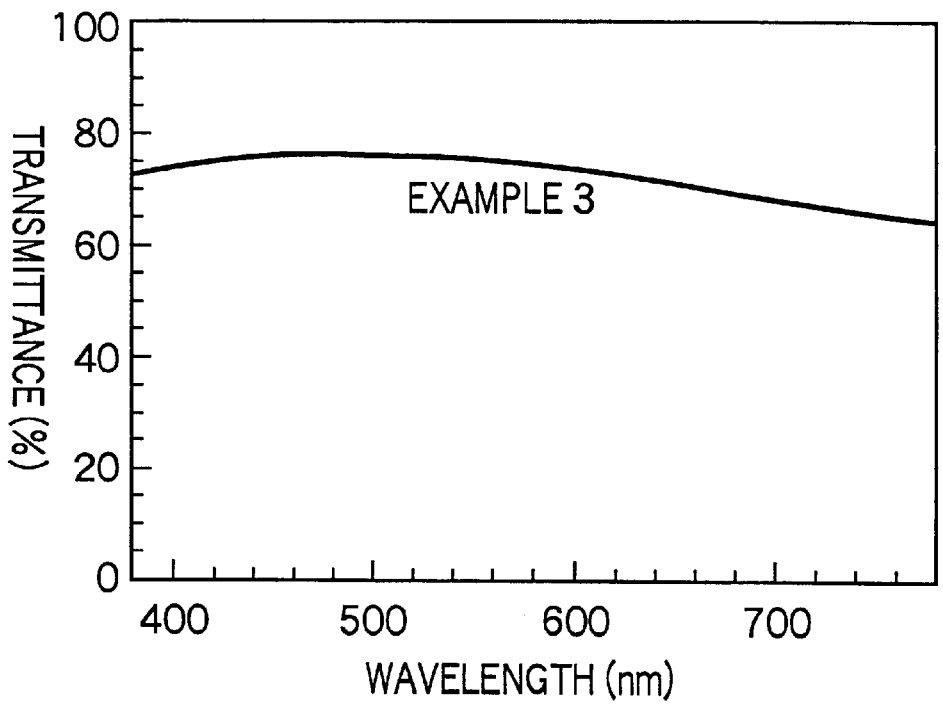
FIG. 6 is a graph showing the transmission profile of the transparent conductive substrate according to Example 3.

Film properties of the transparent 2-layer film formed on the glass substrate are shown in the following Table 1b. In addition, the reflection profile of the transparent conductive layered structure according to Example 3 that was produced is shown in FIG. 5 and the transmission profile is shown in FIG. 6.

EXAMPLE 4

Four grams of titanium nitride microparticles (Netsuren Co., Ltd.) and 0.2 g dispersant were mixed with 25 g water and 10.8 g ethanol and dispersed together with zirconia beads using a paint shaker. The product was then desalted with the above-mentioned ion exchange resin to obtain a titanium nitride microparticle dispersion with a dispersed particle diameter of 80 nm (liquid F).

Other than the fact that a first coating liquid for forming a transparent conductive layer (0.08% Ag, 0.32% Au, 0.2% titanium nitride, 10.8% water, 10.0% acetone, 73.6% EA, and 5.0% DAA) was obtained by using a concentrated dispersion of of the gold-coated silver microparticles prepared by the same method as in Example 1 and liquid F in place of above-mentioned liquid B and adding acetone, ethanol (EA) and diacetone alcohol (DAA) and a silica sol obtained by adding 0.005 g γ-mercaptopropyl trimethoxysilane to 100 g of liquid C-2 described below was used, a glass substrate with a transparent 2-layer film consisting of a transparent conductive layer comprising noble metal microparticles, titanium nitride microparticles, and binder matrix of silicon oxide and a transparent coating layer comprising silicate film the main component of which is silicon oxide, that is, the transparent conductive layered structure according to Example 4, was obtained as in Example 1.

The above-mentioned liquid C-2 was obtained by preparing a substance with an $SiO_2$ (silicon oxide) solid concentration of 10% and a weight-average molecular weight of 1,530 using 19.6 parts methyl silicate 51 (Colcoat Co., Ltd., brand name), 57.8 parts ethanol, 7.9 parts aqueous 1% nitric acid solution, and 14.7 parts purified water, and diluting this with a mixture of isopropyl alcohol (IPA) and n-butanol (NBA) (IPA/NBA=3/1) to a final $SiO_2$ solid concentration of 0.8%. Moreover, as a result of observing the coating liquid for forming the above-mentioned transparent conductive layer, the average particle diameter of the gold-coated silver microparticles and the titanium nitride microparticles was 7.0 nm and 20 nm, respectively.

Figure 7:
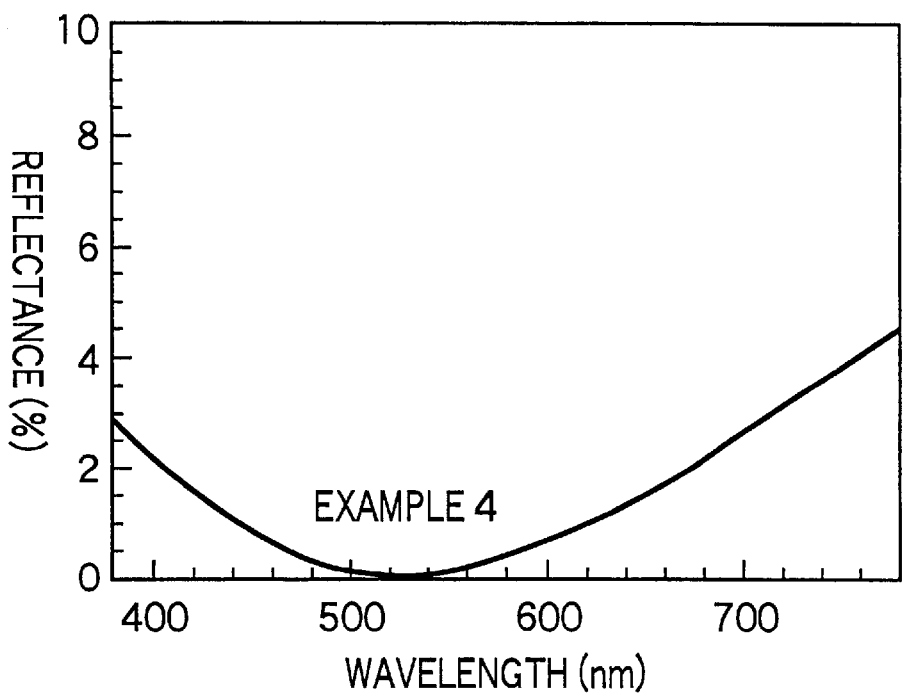
FIG. 7 is a graph showing the reflection profile of the transparent conductive layered structure according to Example 4.
Figure 8:
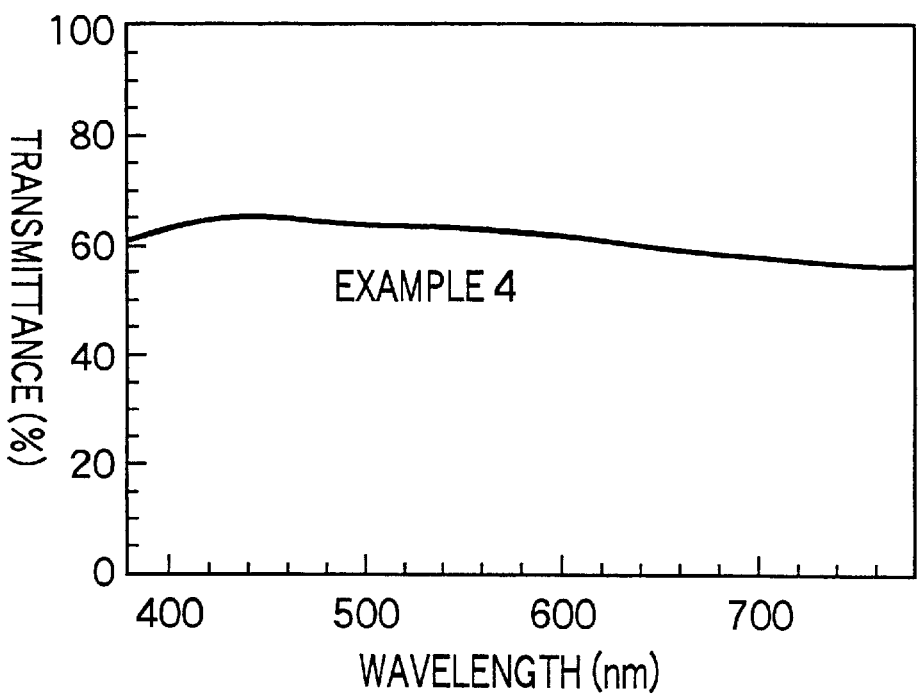
FIG. 8 is a graph showing the transmission profile of the transparent conductive layered structure according to Example 4

Film properties of the transparent 2-layer film formed on the glass substrate are shown in the following Table 1b. In addition, the reflection profile of the transparent conductive layered structure according to Example 4 that was produced is shown in FIG. 7 and the transmission profile is shown in FIG. 8.

EXAMPLE 5

Other than the fact that a first coating liquid for forming a transparent conductive layer (0.08% Ag, 0.32% Au, 0.15% titanium nitride, 10.8% water, 10.0% acetone, 73.65% EA, and 5.0% DAA) was obtained by adding liquid F and acetone, ethanol (ED) and diacetone alcohol (DAA) to a concentrated dispersion of gold-coated silver microparticles prepared by the same method as in Example 1 and a silica sol obtained by adding 0.005 g γ-mercaptopropyl trimethoxysilane to 100 g of above-mentioned liquid C-2 was used, a glass substrate with a transparent 2-layer film consisting of a transparent conductive layer comprising noble metal microparticles, titanium nitride microparticles and binder matrix of silicon oxide and a transparent coating layer comprising silicate film the main component of which is silicon oxide, that is, the transparent conductive layered structure according to Example 5, was obtained as in Example 1.

Figure 9:
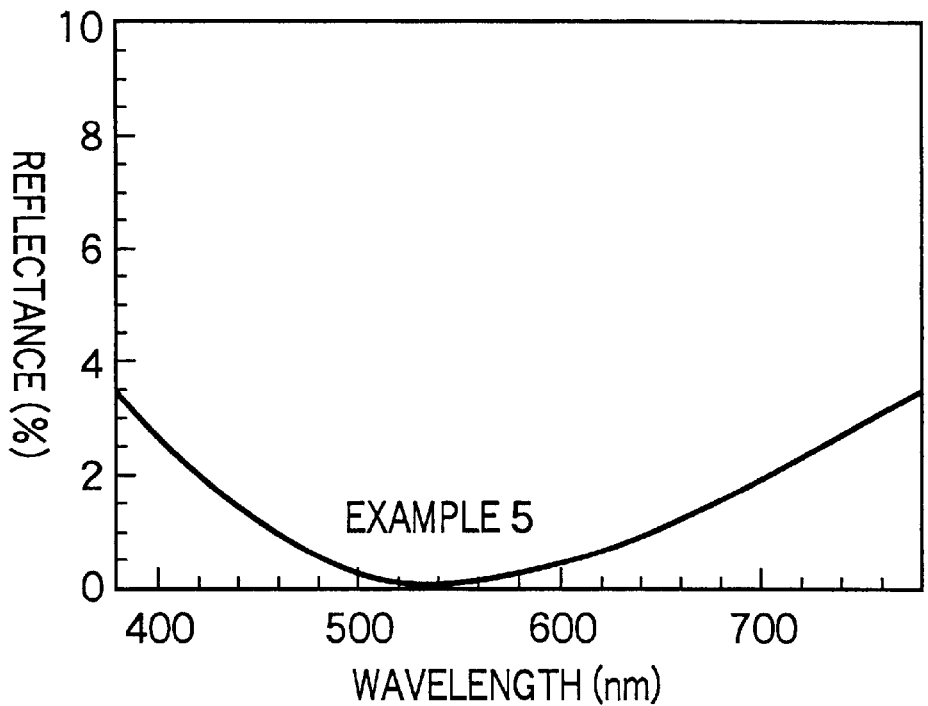
FIG. 9 is a graph showing the reflection profile of the transparent conductive layered structure according to Example 5.
Figure 10:
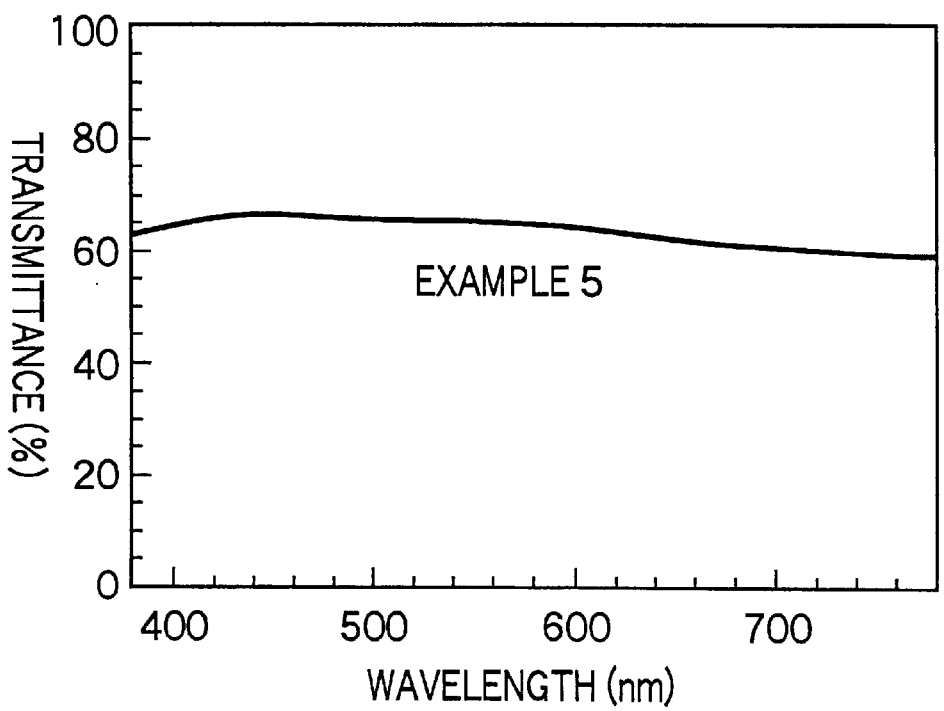
FIG. 10 is a graph showing the transmission profile of the transparent conductive layered structure according to Example 5.

Film properties of the transparent 2-layer film formed on the glass substrate are shown in the following Table 1b. In addition, the reflection profile of the transparent conductive layered structure according to Example 5 that was produced is shown in FIG. 9 and the transmission profile is shown in FIG. 10.

EXAMPLE 6

Five grams titanium nitride microparticles (Netsuren Co., Ltd.) and 5 g silica sol (liquid C-3) were mixed with 20 g purified water and 70 g ethanol and dispersed together with zirconia beads using a paint shaker. The product was then desalted with the above-mentioned ion exchange resin to obtain a silicon oxide-coated titanium nitride microparticle dispersion (liquid G) with a dispersed particle diameter of 90 nm. TEM observation of the above-mentioned silicon oxide-coated titanium nitride microparticles confirmed that silicon oxide was coated on the titanium nitride microparticles.

The above-mentioned silica sol (liquid C-3) was obtained by preparing a substance with an $Sio_2$ (silicon oxide) solid concentration of 10% and weight-average molecular weight of 1,840 using 19.6 parts methyl silicate 51 (Colcoat Co., Ltd., brand name), 57.8 parts ethanol, 7.9 parts aqueous 1% nitric acid solution, and 14.7 parts purified water.

Next, liquid G and acetone, ethanol (EA), propylene glycol monomethyl ether (PGM), diacetone alcohol (DAA), and formamide (FA) were added to a concentrated dispersion of gold-coated silver microparticles prepared by the same method as in Example 1 to obtain a first coating liquid for forming a transparent conductive layer (0.08% Ag, 0.32% Au, 0.2% titanium nitride, 12.7% water, 20.0% acetone, 41.5% EA, 20.0% PGM, 5.0% DAA, and 0.1% FA). As a result of observing the coating liquid for forming a transparent conductive layer that was obtained, the mean particle diameter of the gold-coated silver microparticles and silicon oxide-coated titanium nitride microparticles was 7.5 nm and 30 nm, respectively.

Next, this coating liquid for forming a transparent conductive layer was spin coated (150 rpm, 90 seconds) on a glass substrate (soda lime glass with a thickness of 3 mm) heated to 40° C. and then silica sol (liquid C-4) was spin coated (150 rpm, 60 seconds). The product was further cured for 30 minutes at 180° C. to obtain a glass substrate with a transparent 2-layer film consisting of a transparent conductive layer comprising noble metal microparticles, silicon oxide-coated titanium nitride microparticles, and binder matrix of silicon oxide and a transparent coating layer comprising silicate film the main component of which is silicon oxide, that is, the transparent conductive layered structure according to Example 6.

The above-mentioned silica sol (liquid C-4) here was obtained by adding 0.005 g γ-mercaptopropyl trimethoxysilane to 100 g of liquid C-2 in Example 4.

Figure 11:
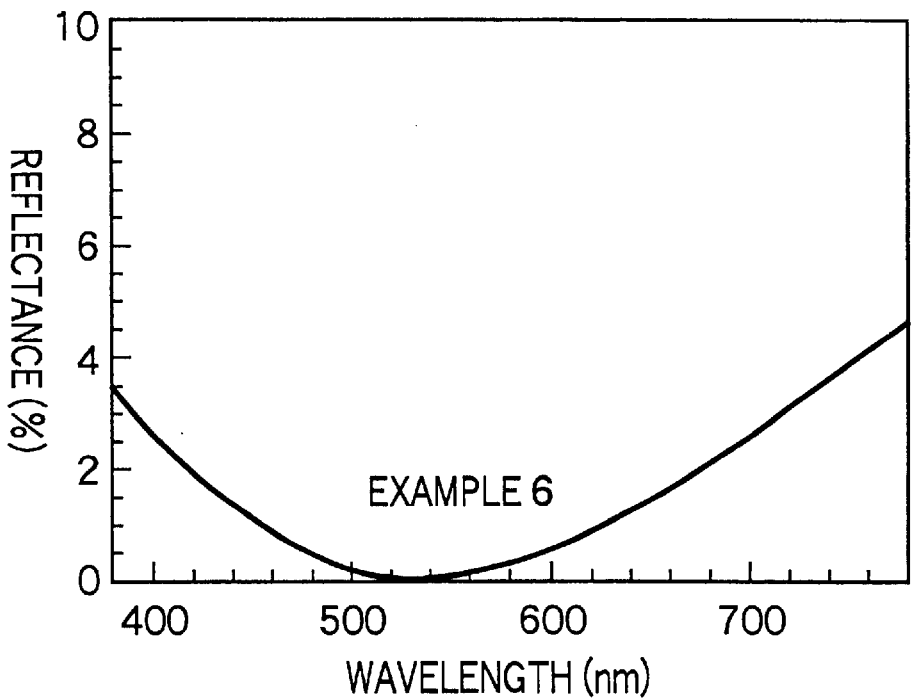
FIG. 11 is a graph showing the reflection profile of the transparent conductive layered structure according to Example 6.
Figure 12:
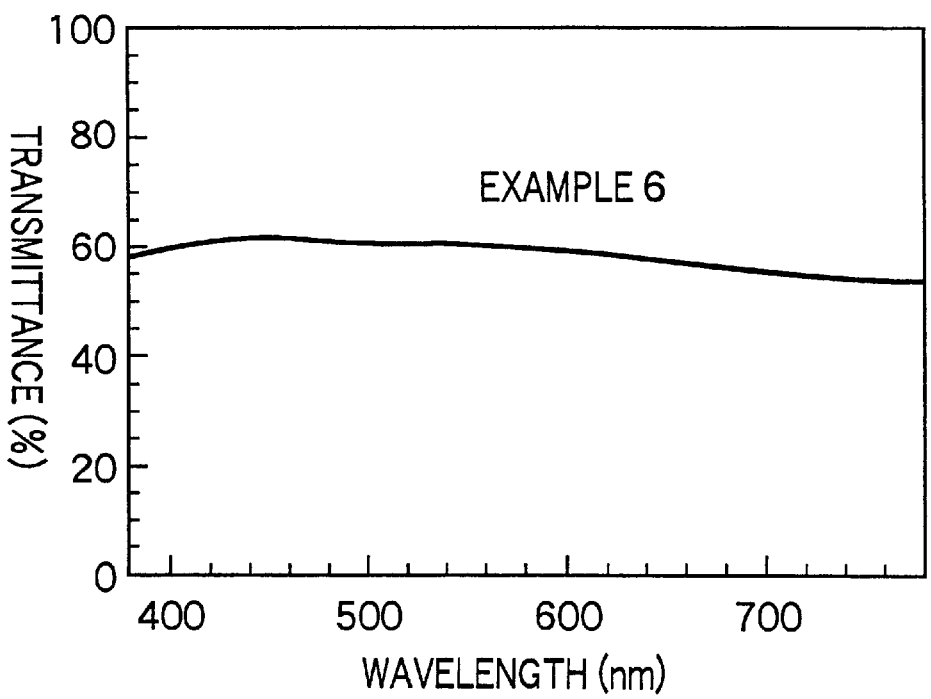
FIG. 12 is a graph showing the transmission profile of the transparent conductive layered structure according to Example 6.

The film properties of the transparent 2-layer film formed on the glass substrate are shown in Table 1b below. The reflection profile of the transparent conductive layered structure according to Example 6 that was produced is shown in FIG. 11 and the transmission profile is shown in FIG. 12.

EXAMPLE 7

Five grams titanium nitride microparticles (Netsuren Co., Ltd.) and 20 g of the above-mentioned liquid C-3 were mixed with 20 g purified water and 5 g ethanol and dispersed together with zirconia beads using a paint shaker. The product was then desalted with the above-mentioned ion exchange resin to obtain a silicon oxide-coated titanium nitride microparticle dispersion (liquid H) with a dispersed particle diameter of 95 nm. TEM observation of the above-mentioned silicon oxide-coated titanium nitride microparticles confirmed that silicon oxide was coated on the titanium nitride microparticles.

Next, other than the fact that liquid H was used in place of liquid G used in Example 6 to obtain a first coating liquid for forming a transparent conductive layer (0.08% Ag, 0.32% Au, 0.15% titanium nitride, 12.7% water, 20.0% acetone, 41.5% EA, 20.0% PGM, 5.0% DAA, and 0.1% FA) and above-mentioned liquid C-2 was used for the silica sol liquid, a glass substrate with a transparent 2-layer film consisting of a transparent conductive layer comprising noble metal microparticles silicon oxide-coated titanium nitride microparticles, and binder matrix of silicon oxide and transparent coating layer comprising silicate film the main component of which is silicon oxide, that is, the transparent conductive layered structure according to Example 7, was obtained as in Example 6.

Figure 13:
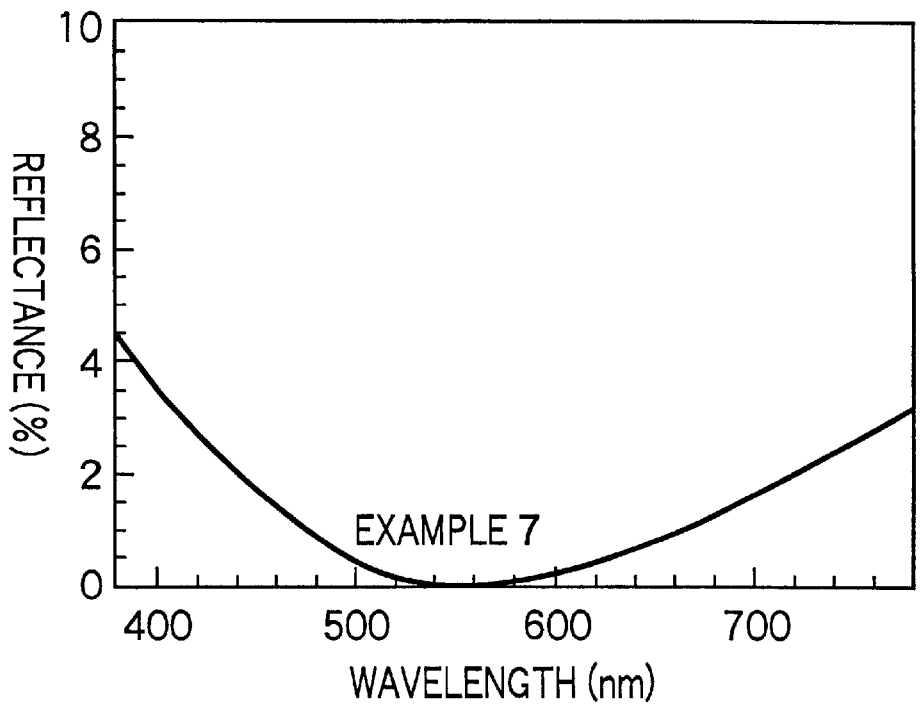
FIG. 13 is a graph showing the reflection profile of the transparent conductive layered structure according to Example 7.
Figure 14:
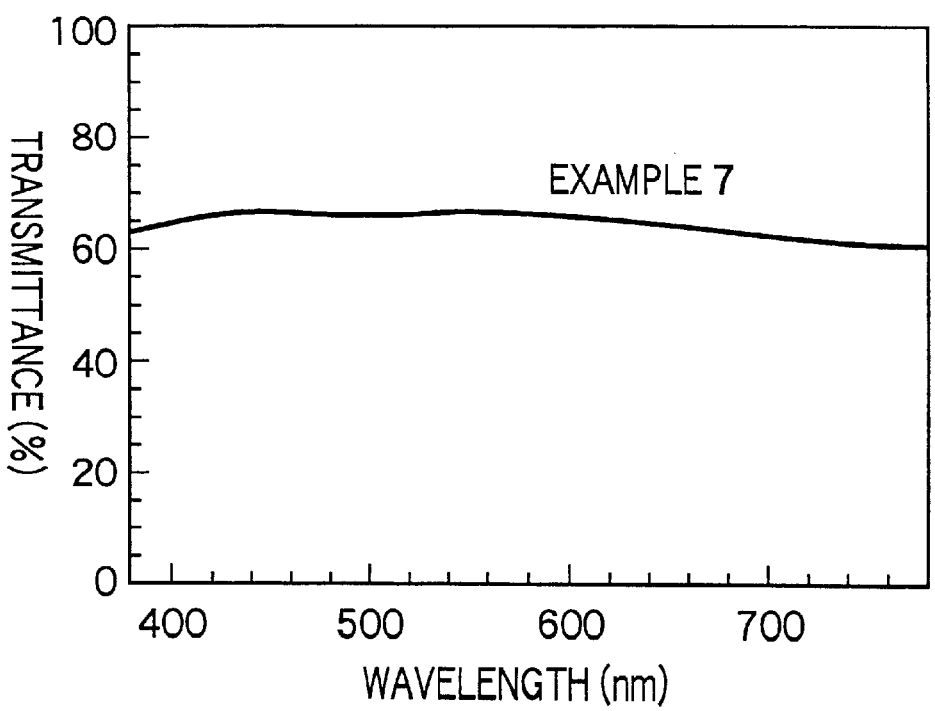
FIG. 14 is a graph showing the transmission profile of the transparent conductive substrate according to Example 7.

Moreover, the film properties of the transparent 2-layer film formed on the glass substrate are shown in Table 1b below. The reflection profile of the transparent conductive layered structure according to Example 7 that was produced is shown in FIG. 13 and the transmission profile is shown in FIG. 14.

EXAMPLE 8

Ten grams composite oxide microparticles of iron, manganese, and copper with a mean particle diameter of 30 nm that had been coated with silicon oxide (TMB #3550, Dainichiseika Color and Chemicals Mfg. Co., Ltd.) and 0.5 g dispersant were mixed with 89.5 g diacetone alcohol and dispersed together with zirconia beads using a paint shaker.

The product was then desalted with ion-exchange resin to obtain a composite oxide microparticle dispersion of iron, manganese, and copper with a dispersed particle diameter of 100 nm (liquid I).

Next, other than the fact that a first coating liquid for forming a transparent conductive layer (0.08% Ag, 0.32% Au, 15% Fe—Mn—Cu—O, 10.7% water, 53.6% EA, 25.0% PGM, 10.0% DAA, 0.1% FA) was obtained using above-mentioned liquid I in place of liquid G used in Example 6 and above-mentioned liquid C-2 was used for the silica sol liquid, a glass substrate with a transparent 2-layer film consisting of a transparent conductive layer comprising noble metal microparticles, composite oxide microparticles of iron, manganese and copper coated with silicon oxide and binder matrix of silicon oxide and a transparent coating layer comprising silicate film the main component of which is silicon oxide, that is, the transparent conductive layered structure according to Example 8, was obtained as in Example 6.

Moreover, the film properties of the 2-layer film formed on a glass substrate are shown in Table 1b.

EXAMPLE 9

Titanium hydroxide obtained by hydrolysis of titanium chloride with an aqueous alkali solution was treated at 800° C. in ammonia gas to obtain black titanium oxynitride microparticles with a mean particle diameter of 30 nm (nitrogen: 15.5%). Five grams black titanium oxynitride microparticles and 10 g above-mentioned liquid C-3 were mixed with 20 g purified water and 65 g ethanol and dispersed together with zirconia beads using a paint shaker. The product was desalted with an ion-exchange resin to obtain a silicon oxide-coated black titanium oxynitride microparticle dispersion with a dispersed particle diameter of 98 nm (liquid J). Furthermore, it was confirmed by TEM observation of the above-mentioned silicon oxide-coated black titanium oxynitride microparticles that silicon oxide was coated on the black titanium oxynitride microparticles.

Next, other than the fact that a first coating liquid for forming a transparent conductive layer (0.08% Ag, 0.32% Au, 0.2% $Ti_xO_yN_z$ 12.7% water, 20.0% acetone, 41.5% EA, 20.0% PGM, 5.0% DAA, 0.1% FA) was obtained using above-mentioned liquid J in place of liquid G used in Example 6 and above-mentioned liquid C-2 was used for the silica sol liquid, a glass substrate with a transparent 2-layer film consisting of a transparent conductive layer comprising noble metal a microparticles, silicon oxide-coated black titanium oxynitride microparticles, and binder matrix of silicon oxide and a transparent coating layer comprising silicate film the main component of which is silicon oxide, that is, the transparent conductive layered structure according to Example 9, was obtained, as in Example 6.

Moreover, the film properties of the 2-layer film formed on a glass substrate are shown in Table 2b.

EXAMPLE 10

One gram phthalocyanine pigment microparticles with a mean particle diameter of 20 nm (Cyanine Blue 5203, Dainichiseika Color and Chemicals Mfg. Co., Ltd.) and 2 g of the above-mentioned liquid C-3 were mixed with 97 g ethanol and dispersed together with zirconia beads using a paint shaker. The product was desalted with the above-mentioned ion-exchange resin to obtain a silicon-coated phthalocyanine blue microparticle dispersion with a dispersed particle diameter of 99 nm (liquid K). Furthermore, it was confirmed by TEM observation of the above-mentioned silicon oxide-coated phthalocyanine blue microparticles that silicon oxide was coated on the phthalocyanine blue microparticles.

Next, other than the fact that a first coating liquid for forming a transparent conductive layer (0.08% Ag, 0.32% Au, 0.1% phthalocyanine blue, 10.7% water, 20.0% acetone, 28.6% EA, 28.8% PGM, 11.2% DAA, 0.1% FA) was obtained using above-mentioned liquid K in place of liquid G used in Example 6 and above-mentioned liquid C-2 was used for the silica sol liquid, a glass substrate with a transparent 2-layer film consisting of a transparent conductive layer comprising noble metal microparticles, silicon oxide-coated phthalocyanine blue microparticles, and binder matrix of silicon oxide and a transparent coating layer comprising silicate film the main component of which is silicon oxide, that is, the transparent conductive layered structure according to Example 10, was obtained as in Example 6.

Moreover, the film properties of the 2-layer film formed on a glass substrate are shown in Table 2b.

EXAMPLE 11

A second coating liquid for forming a transparent conductive layer (0.08% Ag, 0.32% Au, 10.7% water, 73.9% EA, 15.0% DAA) was obtained by adding ethanol (EA) and diacetone alcohol (DAA) to a concentrated dispersion of gold coated-silver microparticles prepared by the same method as in Example 1.

As a result of observing the coating liquid for forming a transparent conductive layer that was obtained with a transmission electron microscope, mean particle diameter of gold-coated silver microparticles was 6.0 nm.

Next, a silica sol liquid (liquid L) was obtained by preparing a substance with an $SiO_2$ solid concentration of 10% and a weight-average molecular weight of 2,830 using 19.6 parts methyl silicate 51 (Colcoat brand name), 57.8 parts ethanol, 7.9 parts aqueous 1% nitric acid solution, and 14.7 parts purified water, diluting this with a mixture of isopropyl alcohol (IPA) and n-butanol (NBA) (IPA/NBA= 3/1) to a final $SiO_2$ solid concentration of 0.8%.

Next, 2 g carbon microparticles (MA7, Mitsubishi Chemical Corporation) with a mean particle diameter of 34 nm and 0.2 g dispersant were mixed with 97.8 g propylene glycol monomethyl ether (PGM) and dispersed together with zirconia beads using a paint shaker to obtain a carbon microparticle dispersion with a dispersed particle diameter of 100 nm (liquid M). Moreover, 9.6 g liquid L and 0.4 g liquid M were mixed to obtain a coating liquid for forming a transparent coating layer.

Next, the above-mentioned coating liquid for forming a transparent conductive layer was spin coated (150 rpm, 60 seconds) on a glass substrate (soda lime glass with a thickness of 3 mm) heated to 35° C. and then the coating liquid for forming a transparent coating layer was spin coated (150 rpm, 60 seconds) and further cured for 30 minutes at 180° C. to obtain a glass substrate with a transparent 2-layer film consisting of a transparent conductive layer comprising noble metal microparticles composed of gold and silver and a transparent coating layer comprising a silicate film the main components of which were carbon microparticles and silicon oxide, that is, the transparent conductive layered structure according to Example 11.

The film properties of the transparent 2-layer film formed on a glass substrate are shown in the following Table 2b.

Figure 15:
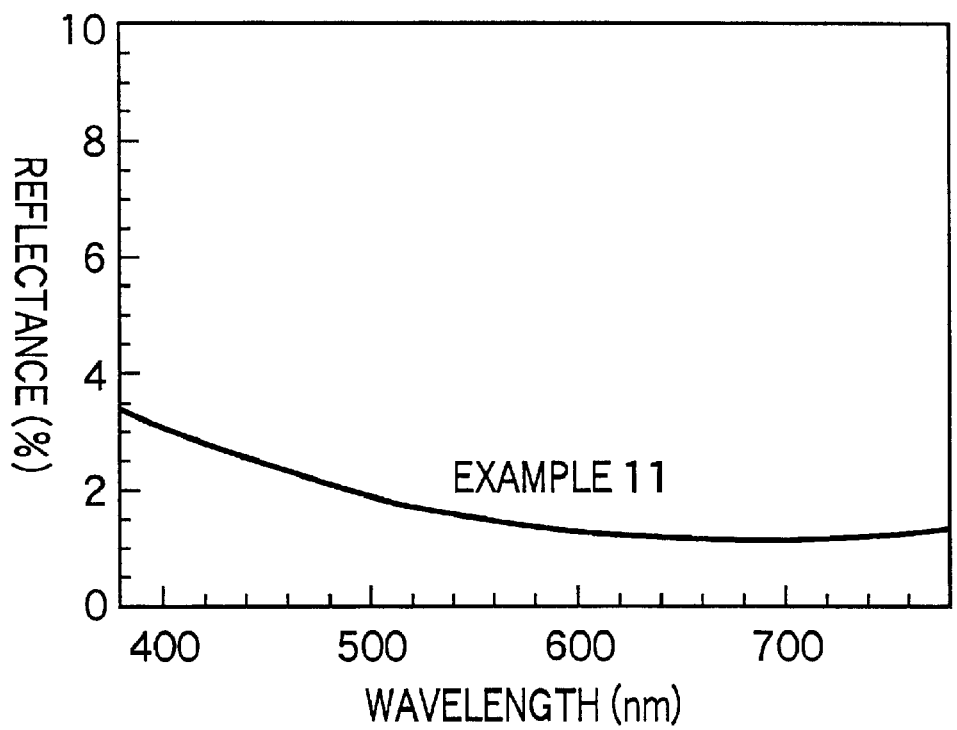
FIG. 15 is a graph showing the reflection profile of the transparent conductive layered structure according to Example 11.
Figure 16:
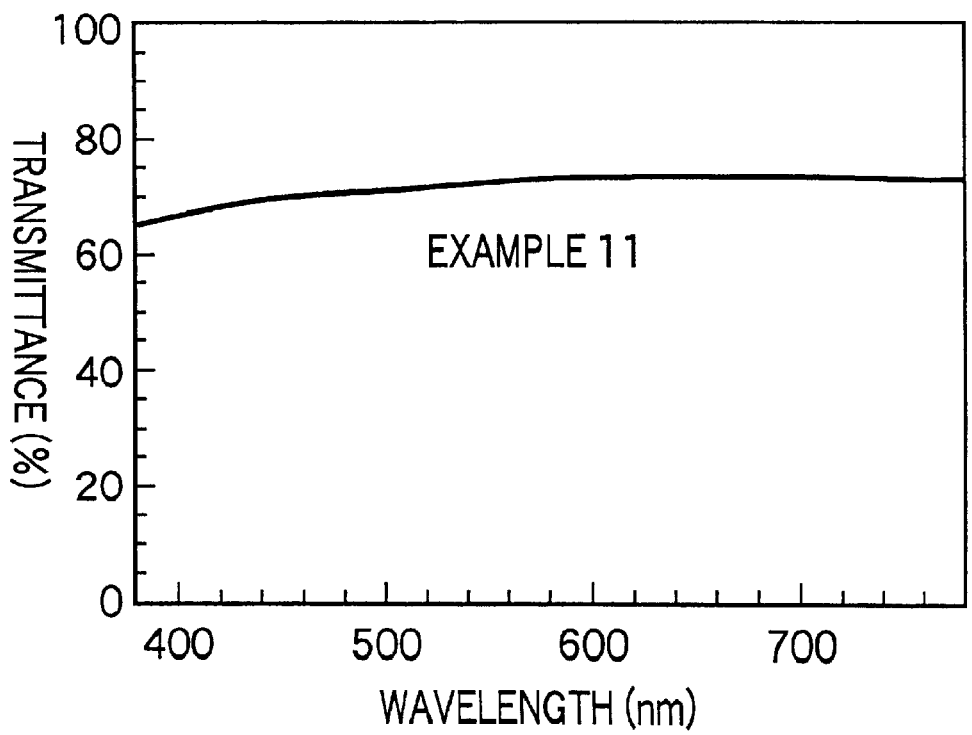
FIG. 16 is a graph showing the transmission profile of the transparent conductive layered structure according to Example 11.

Moreover, the reflection profile of the transparent conductive layered structure according to Example 11 that was produced is shown in FIG. 15 and the transmission profile is shown in FIG. 16.

EXAMPLE 12

Black titanium oxynitride microparticles (15.5% nitrogen) with a mean particle diameter of 30 nm were obtained by treating titanium hydroxide, which had been obtained by hydrolysis of titanium chloride with an aqueous alkali solution, at 800° C. in ammonia gas. Five grams of these black titanium oxynitride microparticles and 0.5 g dispersant were mixed with 94.5 g ethanol and then dispersed together with zirconia beads using a paint shaker to obtain a black titanium oxynitride microparticle dispersion with a dispersed particle diameter of 93 nm (liquid N, 5% black titanium oxynitride).

Other than the fact that a coating liquid for forming a transparent coating layer was obtained using 9.6 g liquid L and 0.4 g liquid N, a glass substrate with a transparent 2-layer film consisting of a transparent conductive layer comprising noble metal microparticles composed of gold and silver and a transparent coating layer comprising a silicate film the main components of which were titanium oxynitride microparticles and silicon oxide, that is, the transparent conductive layered structure according to Example 12, was obtained as in Example 11.

Figure 17:
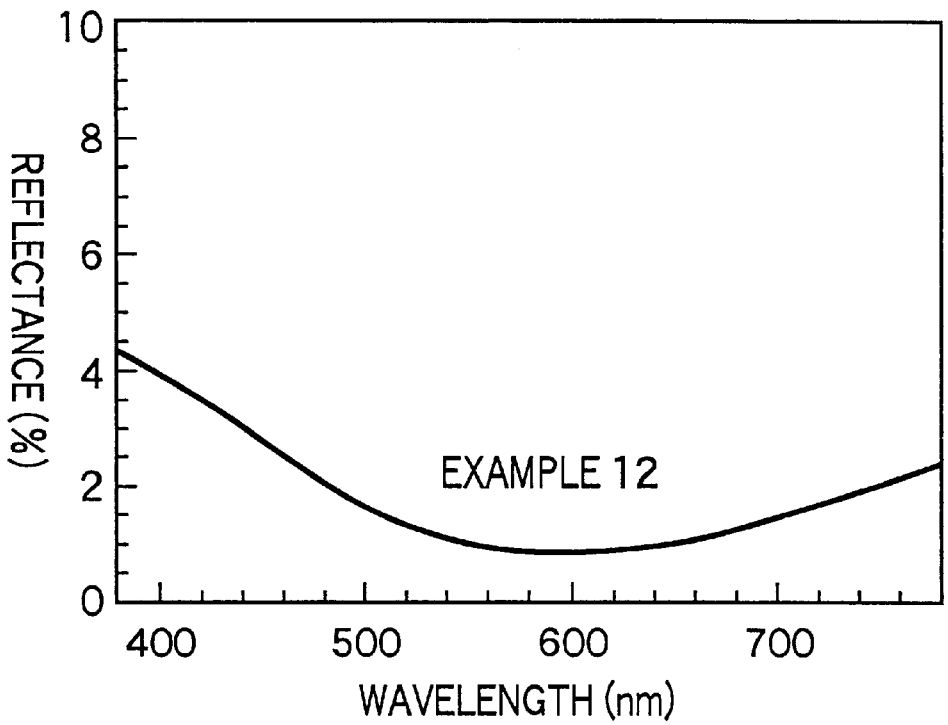
FIG. 17 is a graph showing the reflection profile of the transparent conductive layered structure according to Example 12.
Figure 18:
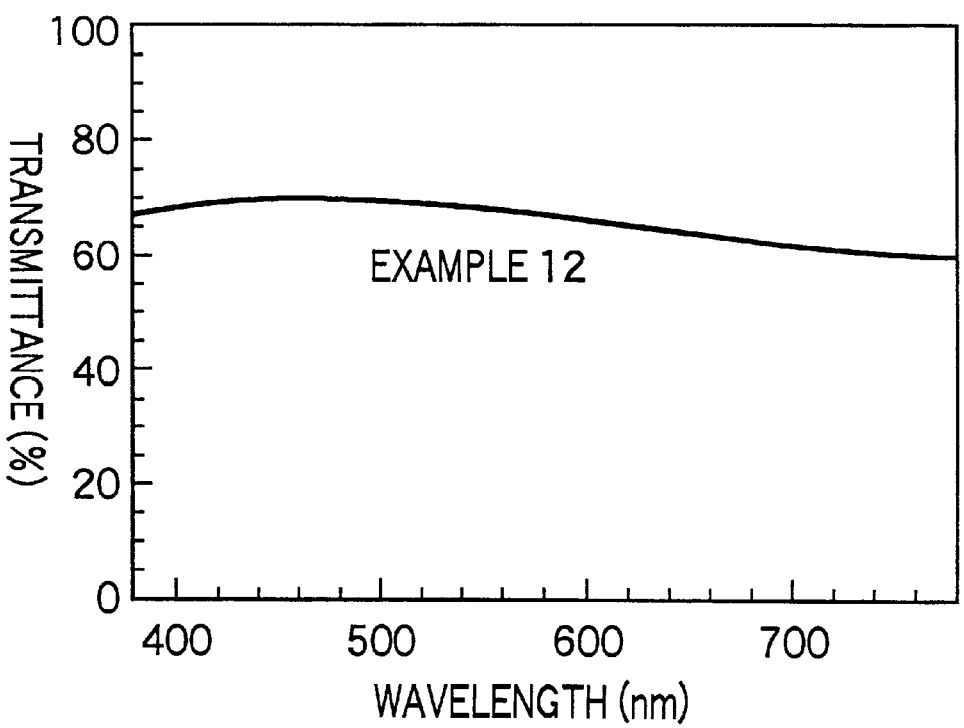
FIG. 18 is a graph showing the transmission profile of the transparent conductive layered structure according to Example 12.

The film properties of the transparent 2-layer film formed on a glass substrate are shown in Table 2b. The reflection profile of the transparent conductive layered structure according to Example 12 that was produced is shown in FIG. 17 and the transmission profile is shown in FIG. 18.

EXAMPLE 13

Ten grams composite oxide microparticles of iron, manganese, and copper (TMB#3550, Dainichiseika Color and Chemicals Mfg. Co., Ltd.) and 0.5 g dispersant were mixed with 89.5 g diacetone alcohol and then dispersed together with zirconia beads using a paint shaker to obtain composite oxide microparticle dispersion of iron, manganese, and copper with a dispersed particle diameter of 98 nm (liquid O).

Moreover, other than the fact that a coating liquid for forming a transparent coating layer was obtained using 9.8 g liquid L and 0.2 g liquid 0 and 2 mg γ-mercaptopropyl trimethoxysilane, a glass substrate with a transparent 2-layer film consisting of a transparent conductive layer comprising noble metal microparticles composed of gold and silver and a transparent coating layer comprising a silicate film the main components of which wrer composite oxide microparticles of iron, manganese and copper and silicon oxide, that is, the transparent conductive layered structure according to Example 13, was obtained as in Example 11.

Figure 19:
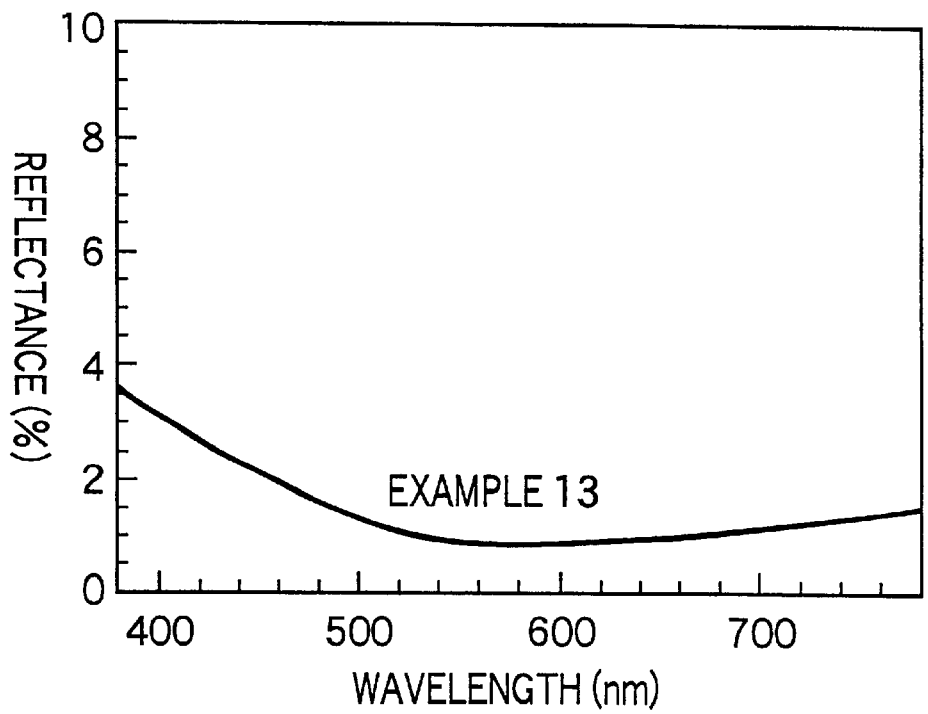
FIG. 19 is a graph showing the reflection profile of the transparent conductive layered structure according to Example 13.
Figure 20:
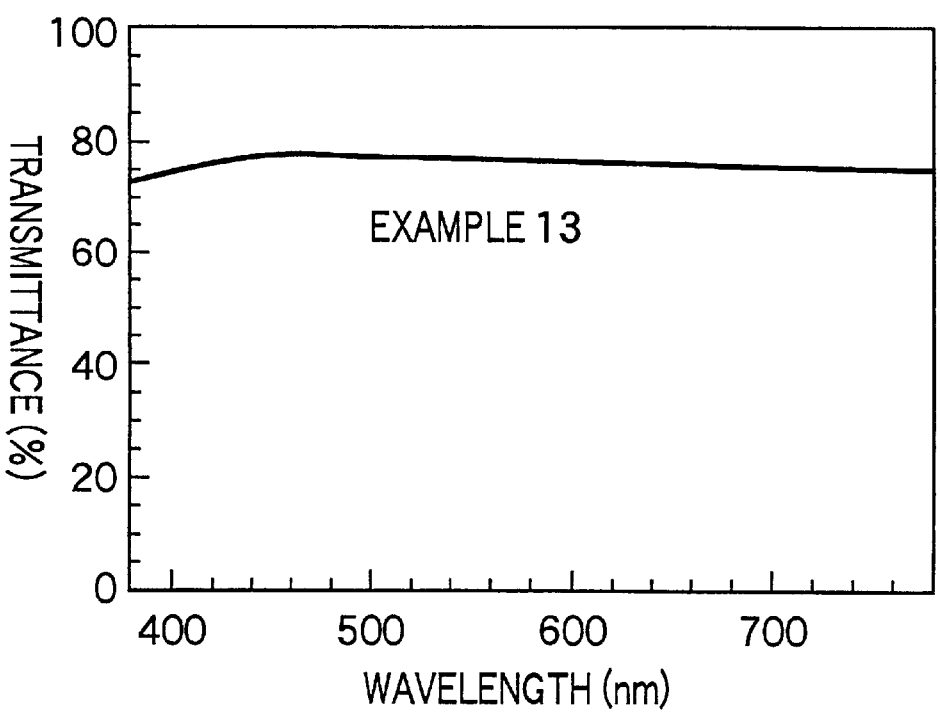
FIG. 20 is a graph showing the transmission profile of the transparent conductive layered structure according to Example 13.

The film properties of the transparent 2-layer film formed on a glass substrate are shown in the following Table 2b. Moreover, the reflection profile of the transparent conductive layered structure according to Example 13 that was produced is shown in FIG. 19 and the transmission profile is shown in FIG. 20.

EXAMPLE 14

Five grams of the black titanium oxynitride in Example 9 and 20 g of the above-mentioned liquid C-3 were mixed with 20 g purified water and 55 g ethanol and dispersed together with zirconia beads using a paint shaker. The product was then desalted with the above-mentioned ion-exchange resin to obtain silicon oxide-coated black titanium oxynitride microparticle dispersion (liquid P) with a dispersed particle diameter of 100 nm. Furthermore, it was confirmed by TEM observation of the above-mentioned silicon oxide-coated black titanium oxynitride that the silicon oxide coated the black titanium oxynitride microparticles.

Next, other than the fact that a coating liquid for forming a transparent coating layer was obtained using 9.6 g liquid L and 0.4 g above-mentioned liquid P, a glass substrate with a transparent 2-layer film consisting of a transparent conductive layer comprising noble metal microparticles composed of gold and silver and a transparent coating layer comprising a silicate film the main components of which were silicon oxide-coated black titanium oxynitride microparticles and silicon oxide, that is, the transparent conductive layered structure according to Example 14, was obtained as in Example 11.

The film properties of the transparent 2-layer film formed on a glass substrate are shown in the following Table 2b.

Comparative Example 1

Ethanol (EA) and diacetone alcohol (DAA) were added to liquid A of Example 1 to obtain a coating liquid for forming a transparent conductive layer not containing black pigment microparticles (0.08% Ag, 0.32% Au, 10.7% water, 73.9% EA, 15.0% DAA). Moreover, other than the fact that the above-mentioned coating liquid for forming a transparent conductive layer was used in place of the coating liquid for forming a transparent conductive layer in Example 1, and liquid C was used as the silica sol, a glass substrate with a transparent 2-layer film consisting of a transparent conductive layer comprising noble metal microparticles and binder matrix of silicon oxide and a transparent coating layer comprising a silicate film the main component of which was silicon oxide, that is, the transparent conductive layered structure according to Comparative Example 1, was obtained as in Example 1.

Figure 21:
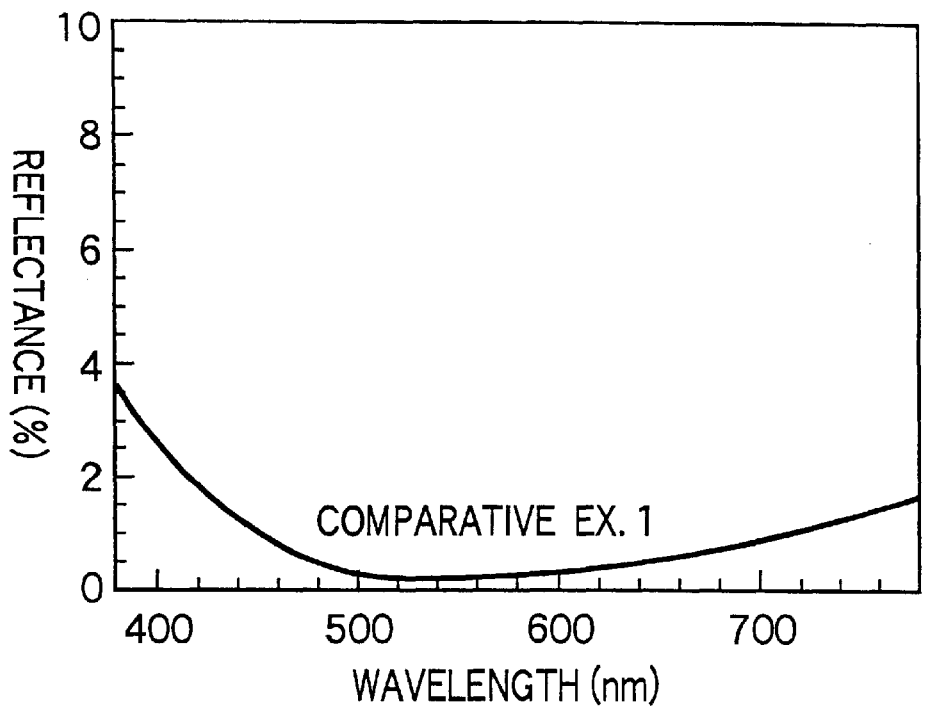
FIG. 21 is a graph showing the reflection profile of the transparent conductive layered structure according to Comparative Example 1.
Figure 22:
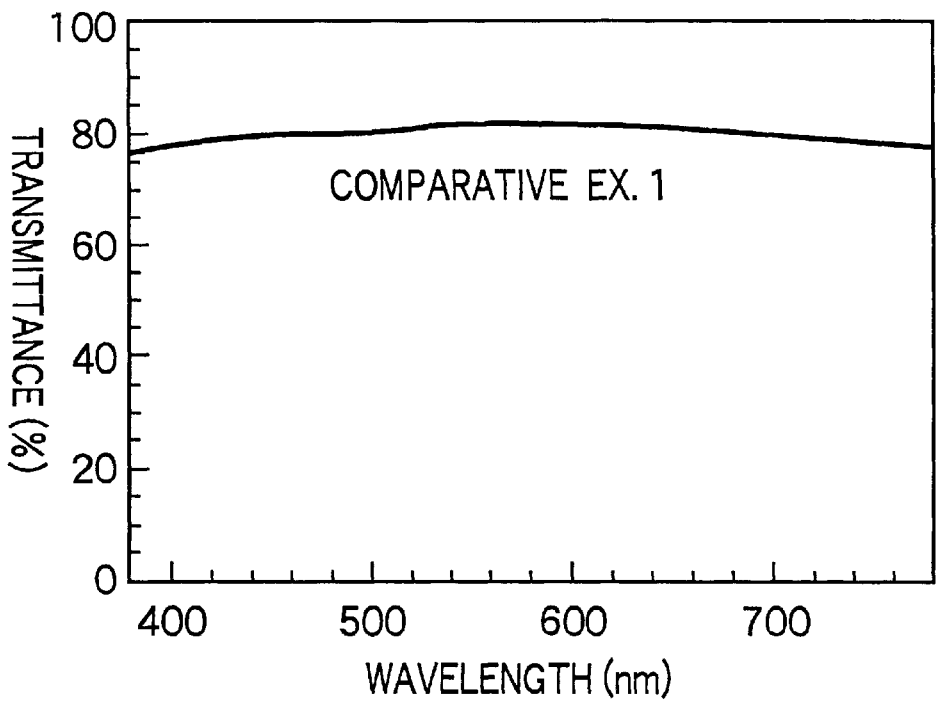
FIG. 22 is a graph showing the transmission profile of the transparent conductive substrate according to Comparative Example 1.

The film properties of the transparent 2-layer film formed on a glass substrate are shown in the following Table 2b. Moreover, the reflection profile of the transparent conductive layered structure according to Comparative Example 1 that was produced is shown in FIG. 21 and the transmission profile is shown in FIG. 22.

Comparative Example 2

Other than the fact that liquid L (silica sol) used in Example 11 was used in place of the coating liquid for forming a transparent coating layer in Example 11, a glass substrate with a transparent 2-layer film consisting of a transparent conductive layer comprising noble metal microparticles composed of gold and silver and a binder matrix of silicon oxide and a transparent coating layer comprising a silicate film the main component of which was silicon oxide, that is, the transparent conductive layered structure according to Comparative Example 2, was obtained as in Example 11.

Figure 23:
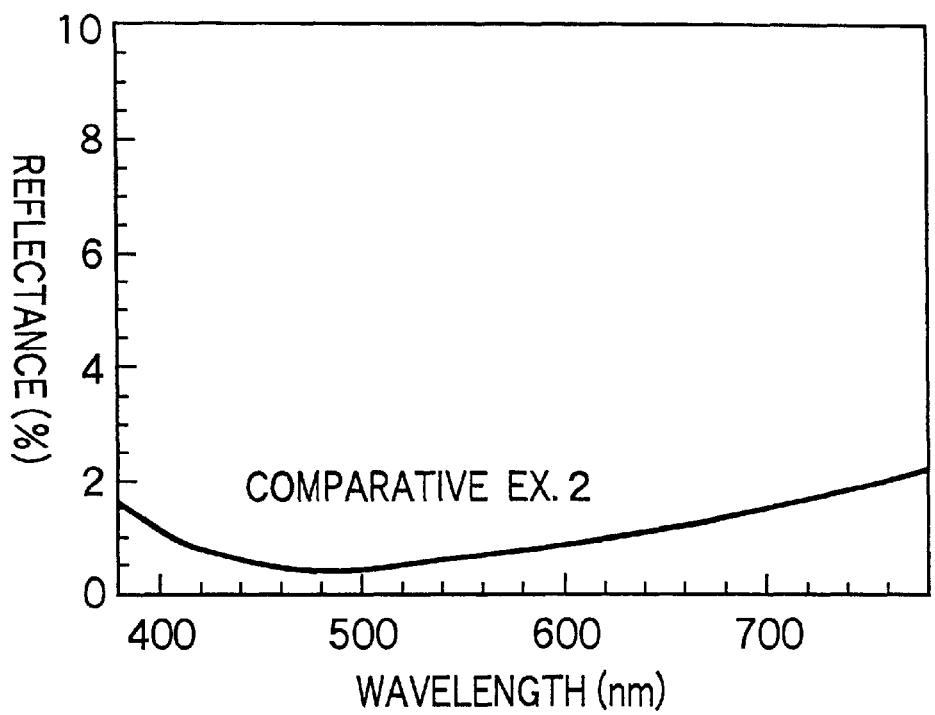
FIG. 23 is a graph showing the reflection profile of the transparent conductive layered structure according to Comparative Example 2.
Figure 24:
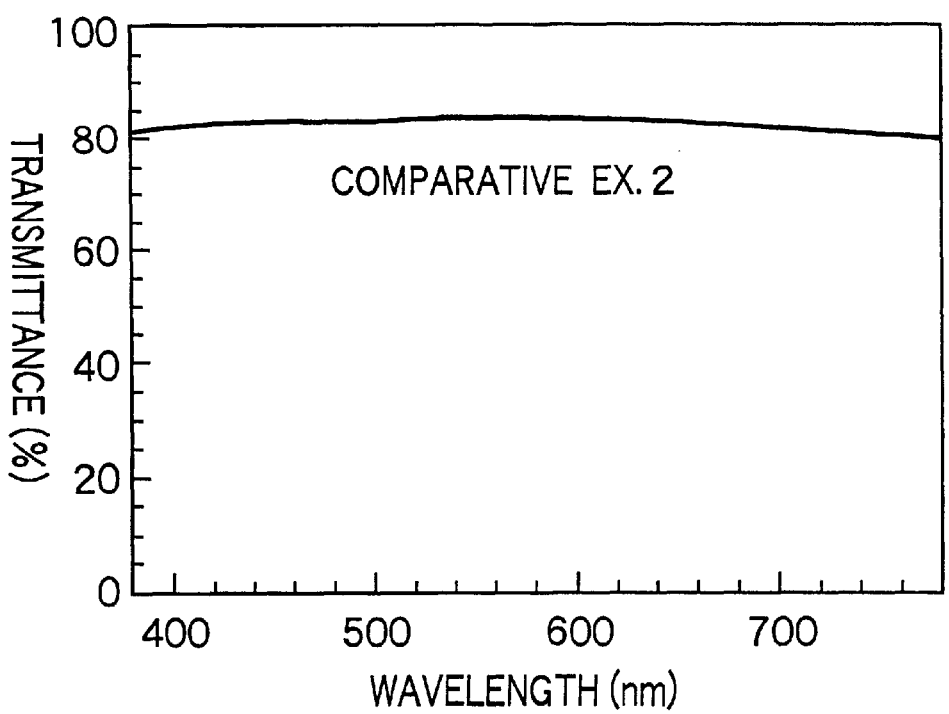
FIG. 24 is a graph showing the transmission profile of the transparent conductive layered structure according to Comparative Example 2.

The film properties of the transparent 2-layer film formed on a glass substrate are shown in the following Table 2b. Moreover, the reflection profile of the transparent conductive layered structure according to Comparative Example 2 that was produced is shown in FIG. 23 and the transmission profile is shown in FIG. 24.

Table 1a

| | Structure of transparent 2-layer film (conductive layer/coating layer) | Mixture ratio[1] (noble metal or silica/pigment) | Coating ratio[2] (colored pigment/silica) |
|---|---|---|---|
| Example 1 | Ag—Au + carbon/silicon oxide | 8/1 | — |
| Example 2 | Ag-Au + Fe—Mn—Cu—O/silicon oxide | 2.7/1 | — |
| Example 3 | Ag—Au + $Ti_xO_yN_z$/silicon oxide | 4/1 | — |
| Example 4 | Ag—Au + TiN/silicon oxide | 2/1 | — |
| Example 5 | Ag—Au + TiN/silicon oxide | 2.7/1 | — |
| Example 6 | Ag—Au + TiN/silicon oxide | 2/1 | 100/10 |
| Example 7 | Ag—Au + TiN/silicon oxide | 2.7/1 | 100/40 |
| Example 8 | Ag—Au + Fe—Mn—Cu—O/silicon oxide | 2.7/1 | 100/20 |

[1]Parts by weight noble metal microparticles or silicon oxide (silica)/parts by weight colored pigment microparticles.
[2]Parts by weight colored pigment in silicon oxide-coated colored pigment microparticles/parts by weight of silicon oxide coating.

Table 1b

| | Visible light transmittance (%) | Standard deviation of transmittance[3] | Haze value (%) | Bottom reflectance/ bottom wavelength (%/nm) | Surface resistance (Ω/□) |
|---|---|---|---|---|---|
| Example 1 | 68.3 | 1.12 | 0.2 | 0.02/530 | 566 |
| Example 2 | 70.4 | 2.43 | 0.6 | 0.03/615 | 1123 |
| Example 3 | 74.8 | 3.59 | 0.4 | 0.10/535 | 1362 |
| Example 4 | 62.1 | 3.04 | 0.7 | 0.06/520 | 730 |
| Example 5 | 65.1 | 2.52 | 0.7 | 0.08/535 | 659 |
| Example 6 | 60.5 | 2.66 | 0.6 | 0.02/530 | 398 |
| Example 7 | 66.6 | 1.88 | 0.5 | 0.03/550 | 319 |
| Example 8 | 71.2 | 2.77 | 0.7 | 0.13/590 | 627 |

[3]Value to transmittance (%) of transparent 2-layer film only not including transparent substrate at each wavelength in 5 nm intervals in the visible light wavelength region (380 to 780 nm).

Table 2a

| | Structure of transparent 2-layer film (conductive layer/coating layer) | Mixture ratio[1] (noble metal or silica/pigment) | Coating ratio[2] (colored pigment/silica) |
|---|---|---|---|
| Example 9 | Ag—Au + $Ti_xO_yN_z$/silicon oxide | 2/1 | 100/20 |
| Example 10 | Ag—Au + phthalocyanine blue/silicon oxide | 4/1 | 100/20 |
| Example 11 | Ag—Au/carbon + silicon oxide | 9.6/1 | — |
| Example 12 | Ag—Au/$Ti_xO_yN_z$ + silicon oxide | 3.8/1 | — |
| Example 13 | Ag—Au/ Fe—Mn—Cu—O + silicon oxide | 3.9/1 | — |
| Example 14 | Ag—Au/$Ti_xO_yN_z$ + silicon oxide | 3.8/1 | 100/40 |
| Comparative Example 1 | Ag—Au/silicon oxide | — | — |
| Comparative Example 2 | Ag—Au/silicon oxide | — | — |

[1]Parts by weight noble metal microparticles or silicon oxide (silica)/parts by weight colored pigment microparticles.
[2]Parts by weight colored pigment in silicon oxide-coated colored pigment microparticles/parts by weight of silicon oxide coating.

Table 2b

| | Visible light transmittance (%) | Standard deviation of transmittance[3] | Haze value (%) | Bottom reflectance/ bottom wavelength (%/nm) | Surface resistance (Ω/□) |
|---|---|---|---|---|---|
| Example 9 | 67.2 | 2.84 | 0.3 | 0.07/545 | 505 |
| Example 10 | 67.6 | 3.95 | 0.5 | 0.55/600 | 695 |
| Example 11 | 70.0 | 2.27 | 0.9 | 1.10/670 | 363 |
| Example 12 | 66.6 | 3.25 | 0.4 | 0.88/595 | 341 |
| Example 13 | 71.4 | 1.07 | 0.3 | 0.85/585 | 369 |
| Example 14 | 64.8 | 3.41 | 0.5 | 0.82/605 | 339 |
| Comparative Example 1 | 81.1 | 1.43 | 0.1 | 0.15/600 | 191 |
| Comparative Example 2 | 83.3 | 1.20 | 0 | 0.37/485 | 274 |

[3]Value to transmittance (%) of transparent 2-layer film only not including transparent substrate at each wavelength in 5 nm intervals in the visible light wavelength region (380 to 780 nm).

Evaluation

1. As is clear from the results of "Surface resistance" shown in Tables 1b and 2b, it is confirmed that although the transparent conductive layer or transparent coating layer in Examples 1 through 14 contain colored pigment microparticles, surface resistance of the same transparent 2-layer film is within the acceptable range (10 to 5000 Ω/□), posing no problem in terms of practical use.

2. Moreover, as is clear from the results of "bottom reflectance/bottom wavelength" in Tables 1b and 2b, it is also confirmed that the transparent conductive layered structure according to each example has relatively good low reflectance.

3. As is clear from the results of "Visible light transmittance" shown in Tables 1b to 2b, it is confirmed that in contrast to the fact that visible light transmittance of the transparent 2-layer film according to each example is adjusted to within a prescribed range (40 to 75%), the respective visible light transmittance of the transparent 2-layer film according to Comparative Examples 1 to 2 is 81.1 and 83.3 and cannot be adjusted to within the prescribed range.

Moreover, as is clear from FIGS. 2, 4, 6, 8, 10, 12, 14, 16, 18, and 20, it is confirmed that the transparent 2-layer film in each example has low transmittance and a flat transmission profile.

4. It can be confirmed from comparison of surface resistance (Ω/□) in each of the following examples that conductivity of the transparent 2-layer film is markedly improved by coating the colored pigment microparticles in the transparent conductive layered structure, wherein colored pigment microparticles are added to the transparent conductive layer, with silicon oxide.

That is, this is confirmed by comparison of surface resistance of Example 2 and Example 8 (1,123 and 627 Ω/□), comparison of surface resistance of Example 3 and Example 9 (1,362 and 505 Ω/□), comparison of surface resistance of Example 4 and Example 6 (730 and 398 Ω/□), and comparison of surface resistance of Example 5 and Example 7 (659 and 319 Ω/□).

5. Moreover, it can be confirmed from comparison of mechanical strength, which is discussed below, of Example 12 and Example 14 that mechanical strength of the transparent 2-layer film can be further improved by coating colored pigment microparticles in a transparent conductive layered structure, wherein colored pigment microparticles are added to the transparent coating layer, with silicon oxide.

That is, 4 or 5H was obtained in Example 12, while 6 H was obtained in Example 14 in pencil hardness tests (evaluation by drawing lines in the surface of the transparent 2-layer film with a pencil having a hardness of H to 9H under a load of 1 kg.).

6. Furthermore, "weather resistance tests" were also performed as described below on the transparent conductive layered structures according to each example.

That is, the transparent conductive layered structure according to each example was immersed for 24 hours in an aqueous 10% brine solution, an aqueous 50% citric acid solution and an aqueous 5% ammonia solution and surface resistance and appearance of the transparent 2-layer film on the transparent substrate (glass substrate) was studied, but other than seeing a slight change in the reflected color in terms of film appearance of those immersed in the aqueous 5% ammonia solution, no changes were observed.

Consequently, it is confirmed that the transparent conductive layered structure according to each example also have the same properties of weather resistance and chemical resistance as in the past.

7. Furthermore, although gold-coated silver microparticles were used in each example and comparative example, the same tests were performed on platinum-coated silver microparticles and noble metal coated silver microparticles coated with a compound of gold and platinum.

Moreover, it was confirmed that even when these microparticles were used, they displayed the same tendency as each of the above-mentioned examples and comparative examples.

What is claimed is:

1. A transparent conductive layered structure having a transparent substrate and a transparent 2-layer film consisting of a transparent conductive layer and a transparent coating layer formed in succession on this transparent substrate;

wherein the main components of said transparent conductive layer are noble metal microparticles with a mean particle diameter of 1 to 100 nm, said noble metal microparticles being composed of gold and/or platinum and silver and containing said gold and/or platinum within a range exceeding 50 wt % up to 95 wt %, based on the total weight of the noble metal microparticles and also having an alloy layer formed in part or wholly on the surface thereof from the gold and/or platinum and the silver; colored pigment microparticles with a mean particle diameter of 5 to 200 nm; and binder matrix;

said noble metal microparticles are mixed at a ratio of 1 to 40 parts by weight per 1 part by weight colored pigment microparticles;

said transparent 2-layer film has a surface resistance of 10 to 5,000 Ω/□;

reflectance of said transparent 2-layer film which becomes minimum in the reflection profile of the visible light region is 0 to 2.5%; and the visible light transmittance of the transparent 2-layer film only not including said transparent substrate is 40 to 75%, while standard deviation of transmittance of the transparent 2-layer film only not including said transparent substrate is 0 to 5% at each wavelength in 5 nm intervals of the visible light wavelength region (380 to 780 nm).

2. A transparent conductive layered structure having a transparent substrate and a transparent 2-layer film consisting of a transparent conductive layer and transparent coating layer formed in succession on this transparent substrate;

wherein the main components of said transparent conductive layer are noble metal microparticles with a mean particle diameter of 1 to 100 nm, said noble metal microparticles being composed of gold and/or platinum and silver and containing said gold and/or platinum within a range exceeding 50 wt % up to 95 wt % based on the total weight of the noble metal microparticles and also having an alloy layer formed in part or wholly on the surface thereof from the gold and/or the platinum and the silver; and binder matrix;

the main components of said transparent coating layer are colored pigment microparticles with a mean particle diameter of 5 to 200 nm, and binder matrix;

said transparent 2-layer film has a surface resistance of 10 to 5,000 Ω/□;

reflectance of said transparent 2-layer film which becomes minimum in the reflection profile of the visible light region is 0 to 2.5%; and visible light transmittance of the transparent 2-layer film only not including said transparent substrate is 40 to 75%, while standard deviation in transmittance of the transparent 2-layer film only not including said transparent substrate is 0 to 5% at each wavelength in 5 nm intervals of the visible light wavelength region (380 to 780 nm).

3. A transparent conductive layered structure according to claim 1 or 2, wherein said colored pigment microparticles are composed of at least one type of microparticles selected from the group of consisting of carbon, black titanium oxide, black titanium oxynitride, composite oxide pigment, quinacridone pigment, anthraquinone pigment, perylene pigment, isoindolinone pigment, azo pigment, phthalocyanine pigment, cobalt violet, molybdenum orange, ultramarine, Prussian blue, and titanium nitride.

4. A transparent conductive layered structure according to claim 1 or 2, wherein said colored pigment microparticles are silicon oxide-coated colored pigment microparticles the surface of which has been coated with silicon oxide.

5. A transparent conductive layered structure according to claim 4, wherein the amount of silicon oxide coating on said silicon oxide-coated colored pigment microparticles is set in a range of 5 to 100 parts by weight per 100 parts by weight colored pigment microparticles.

6. A transparent conductive layered structure according to claim 1 or 2, wherein silicon oxide is the main component of the binder matrix of the transparent conductive layer and the transparent coating layer.

7. A display comprising a display main unit and a front panel arranged on the front side of this display main unit, wherein a transparent conductive layered structure according to claim 1 or 2 is used as said front panel with the transparent 2-layer film side disposed on the outside.

8. A coating liquid for forming a transparent conductive layer of a transparent conductive layered structure having a transparent substrate and a transparent 2-layer film consisting of a transparent conductive layer and a transparent coating layer formed in succession on this transparent substrate, said transparent 2-layer film having a surface resistance of 10 to 5,000 Ω/□, reflectance of said transparent 2-layer film which becomes minimum in the reflection profile of the visible light region being 0 to 2.5%, the visible light transmittance of the transparent 2-layer film only not including said transparent substrate being 40 to 75%, and standard deviation of transmittance of the transparent 2-layer film only not including said transparent substrate being 0 to 5% at each wavelength in 5 nm intervals of a visible light wavelength region (380 to 780 nm);

wherein the main components of said coating liquid are noble metal-coated silver microparticles with a mean particle diameter of 1 to 100 nm containing gold and/or platinum within a range exceeding 50 wt % up to 95 wt % based on the total weight of the noble metal-coated silver microparticles, the surface of which is coated with the gold or the platinum alone or a compound of gold and platinum; colored pigment microparticles with a mean particle diameter of 5 to 200 nm; and a solvent in which these microparticles are dispersed; and the noble-metal coated silver microparticles are mixed at a ratio of 1 to 40 parts by weight per 1 part by weight of said colored pigment microparticles.

9. A coating liquid for forming a transparent conductive layer according to claim 8, wherein said colored pigment microparticles are composed of at least one type of microparticles selected from the group consisting of carbon, black titanium oxide, black titanium oxynitride, composite oxide pigment, quinacridone pigment, anthraquinone pigment, perylene pigment, isoindolinone pigment, azo pigment, phthalocyanine pigment, cobalt violet, molybdenum orange, ultramarine, Prussian blue, and titanium nitride.

10. A coating liquid for forming a transparent conductive layer according to claim 8, wherein said colored pigment microparticles are silicon oxide-coated colored pigment microparticles the surface of which is coated with silicon oxide.

11. A coating liquid for forming a transparent conductive layer according to claim 10, wherein the amount of silicon oxide coating on said silicon oxide-coated colored pigment microparticles is 5 to 100 parts by weight colored pigment microparticles.

12. A coating liquid for forming a transparent conductive layer according to claim 8, containing an inorganic binder.

* * * * *